United States Patent
Kinoshita et al.

(10) Patent No.: US 9,379,944 B2
(45) Date of Patent: Jun. 28, 2016

(54) COMPUTER SYSTEM, COMPUTER SYSTEM INFORMATION PROCESSING METHOD, AND INFORMATION PROCESSING PROGRAM

(75) Inventors: Naohide Kinoshita, Tokyo (JP); Tomohito Uchida, Tokyo (JP); Shinichi Tokunaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 391 days.

(21) Appl. No.: 14/110,882

(22) PCT Filed: May 17, 2011

(86) PCT No.: PCT/JP2011/002739
§ 371 (c)(1),
(2), (4) Date: Oct. 9, 2013

(87) PCT Pub. No.: WO2012/157023
PCT Pub. Date: Nov. 22, 2012

(65) Prior Publication Data
US 2014/0040449 A1 Feb. 6, 2014

(51) Int. Cl.
| | |
|---|---|
| *G06F 15/173* | (2006.01) |
| *H04L 12/24* | (2006.01) |
| *G06F 9/445* | (2006.01) |
| *G06F 11/30* | (2006.01) |
| *G06F 11/32* | (2006.01) |
| *G06F 11/34* | (2006.01) |

(52) U.S. Cl.
CPC .............. *H04L 41/0893* (2013.01); *G06F 8/60* (2013.01); *G06F 11/3006* (2013.01); *G06F 11/3051* (2013.01); *G06F 11/32* (2013.01); *G06F 11/3409* (2013.01)

(58) Field of Classification Search
CPC . H04L 41/0893; G06F 11/3051; G06F 11/32; G06F 11/3006; G06F 11/3409; G06F 8/60
See application file for complete search history.

(56) References Cited

U.S. PATENT DOCUMENTS

| | | | | |
|---|---|---|---|---|
| 6,151,643 A | * | 11/2000 | Cheng | G06F 8/62 |
| | | | | 709/200 |
| 2005/0289177 A1 | * | 12/2005 | Hohmann, II | G06F 9/4411 |
| 2007/0244999 A1 | * | 10/2007 | Hamanaka | G06F 8/65 |
| | | | | 709/220 |

(Continued)

FOREIGN PATENT DOCUMENTS

| | | |
|---|---|---|
| JP | 10-301760 A | 11/1998 |
| JP | 2002-024238 A | 1/2002 |
| JP | 2005-250732 A | 9/2005 |

(Continued)

*Primary Examiner* — Ario Etienne
*Assistant Examiner* — Kidest Mendaye
(74) *Attorney, Agent, or Firm* — Volpe and Koenig, P.C.

(57) ABSTRACT

A management server acquires software configuration information, hardware configuration information, and operation achievement information from each server system; generates server operation achievement information for managing operation achievements of each server system based on each acquired information; generates server operation achievement statistic information by aggregating the software configuration information about each server system based on the generated server operation achievement information; and, upon receipt of a software configuration decision request from a requestor server system, selects the software configuration information which matches a hardware configuration of the requestor server system, from the server operation achievement statistic information.

10 Claims, 28 Drawing Sheets

(56) References Cited

U.S. PATENT DOCUMENTS

2009/0007105 A1* 1/2009 Fries .................. G06F 8/65
                                            718/1
2009/0089775 A1* 4/2009 Zusman ............... G06F 8/65
                                            717/173

FOREIGN PATENT DOCUMENTS

| JP | 2006-079534 A | 3/2006 |
| JP | 2008-140333 A | 6/2008 |
| JP | 2009-187420 A | 8/2009 |
| JP | 2009-230398 A | 10/2009 |

* cited by examiner

FIG.5

| SOFTWARE CONFIGURATION | | |
|---|---|---|
| TYPE | NAME | VERSION |
| OS | OS_A | V6.1 |
| DB | RDB | Any |
| WEB | None | None |
| SERVER CHARACTERISTIC | DB SERVER | |

FIG.6

| IMPORTANT ITEMS | | |
|---|---|---|
| PRIORITY | ITEM | EXCLUSION CONDITION |
| 1 | AVERAGE OPERATION TIME | 10 |
| 2 | NUMBER OF TIMES OF UNSCHEDULED OUTAGE | 1000 |
| 3 | SECURITY REPORT | – |

FIG. 7

| | | 66 |
|---|---|---|
| 66A | SYSTEM ID | ABCDEEEEKK002 |
| 66B | HW CONFIGURATION ID | 001 |
| 66C | MACHINE TYPE | Server_A 70 |
| 66D | PROCESSOR | Proc_F |
| 66E | MEMORY | 16GB |
| 66F | NIC | PCIe 10Gbps |
| 66G | HBA | HBA_C |

FIG. 8

| SYSTEM ID 40A | HW CONFIGURATION ID 40B | SW CONFIGURATION ID 40C | SERVER CHARACTERISTIC 40D | OPERATION TIME 40E | NUMBER OF TIMES OF UNSCHEDULED OUTAGE 40F | ACTIVATION DATE AND TIME 40G | LAST STOP DATE AND TIME 40H | STATUS 40I |
|---|---|---|---|---|---|---|---|---|
| ABCDEEEKK002 | 001 | 001 | DB | 10000 | 0 | 10/12/10:09:00 | -- | ACTIVE |
| ASDFEEEEKK112 | 002 | 001 | WEB | 20000 | 1 | 10/12/12:10:00 | 10/10/01:23:00 | ACTIVE |
| ASDFEEEEKK113 | 001 | 002 | NA | 10 | 2 | 11/01/17:08:30 | 11/01/17:08:30 | ACTIVE |
| ABCDEEEKK002 | 001 | 101 | DB | 100 | 2 | 10/09/01:09:00 | 10/12/10:08:00 | STOPPED |
| ABCDEEEKK002 | 021 | 101 | DB | 1000 | 5 | 10/03/10:09:00 | 10/09/10:08:00 | STOPPED |
| ASDFEEEEKK112 | 002 | 003 | WEB | 200000 | 3 | 10/01/04:09:00 | 09/12/31:23:50 | STOPPED |

| SW CONFIGURATION ID | OS | DB | WEB | HBA DRIVER | NIC DRIVER |
|---|---|---|---|---|---|
| 001 | OS_A V6.1.5 | RDBv8 | YYY | HBAdrv v10.1 | NICdrv v10.1 |
| 002 | OS_A V6.1.5 | RDBv7 | YYY | HBAdrv v10.1 | NICdrv v10.1 |
| .. | .. | .. | .. | .. | .. |
| 100 | OS_A V6.1.1 | RDBv6 | YYY | HBAdrv v9.1 | NICdrv v8.1 |
| .. | .. | .. | .. | .. | .. |

| SW CONFIGURATION ID | MACHINE TYPE | PROCESSOR | MEMORY | HBA | NIC |
|---|---|---|---|---|---|
| 001 | Server_A_70 | Proc_F | 16GB | HBA_C | PCIe 10Gbps |
| 002 | Server_A_50 | Proc_F | 64GB | HBA_C | PCIe 10Gbps |
| .. | .. | .. | .. | .. | .. |
| 100 | Server_A_90 | Proc_D | YYY | HBA_C | PCIe 100Mbps |
| .. | .. | .. | .. | .. | .. |

48A — SW CONFIGURATION ID
48B — MACHINE TYPE
48C — PROCESSOR
48D — MEMORY
48E — HBA
48F — NIC
48

FIG. 11

| SW ID | SOFTWARE NAME | NUMBER OF SECURITY PROBLEM REPORTS | PUBLICATION DATE AND TIME |
|---|---|---|---|
| 001 | OS_A V6.1.5 | 2 | 2010/12/24 00:00 |
| 002 | OS_A V6.1.4 | 10 | 2010/12/24 00:00 |
| 003 | OS_A V6.1.3 | 12 | 2010/12/24 00:00 |
| .. | .. | .. | .. |
| 100 | OS_B V7 | 10 | 2011/01/17 08:00 |
| .. | .. | .. | .. |

| SW CONFIGURATION (42A) | OS (42B) | DB (42C) | WEB (42D) | NUMBER OF ACTIVE SOFTWARE PROGRAMS (42E) | AVERAGE OPERATION TIME (42F) | NUMBER OF TIMES OF UNSCHEDULED OUTAGE (42G) | SECURITY REPORT (42H) |
|---|---|---|---|---|---|---|---|
| 001 | OS_A V6.1.5 | RDBv8 | YYY | 2000 | 400000 | 300 | 0 |
| 002 | OS_A V6.1.5 | RDBv7 | YYY | 40000 | 200000 | 400 | 20 |
| 003 | OS_A V6.1.4 | RDBv8 | YYY | 200 | 10000 | 100 | 0 |
| 004 | OS_A V6.1.4 | RDBv7 | XXX | 60000 | 300000 | 20 | 40 |
| .. | .. | .. | .. | .. | .. | .. | .. |
| 100 | OS_A V6.1.1 | RDBv6 | YYY | 100 | 1000000 | 1000 | 200 |

FIG. 13

| SW CONFIGURATION | OS | DB | WEB | NUMBER OF ACTIVE SOFTWARE PROGRAMS | AVERAGE OPERATION TIME | NUMBER OF TIMES OF UNSCHEDULED OUTAGE | SECURITY REPORT |
|---|---|---|---|---|---|---|---|
| 001 | OS_A V6.1.5 | RDBv8 | YYY | 10 | 100 | 300 | 0 |
| 002 | OS_A V6.1.5 | RDBv7 | YYY | 2000 | 300000 | 2 | 20 |
| 003 | OS_A V6.1.4 | RDBv8 | YYY | 20 | 300 | 60 | 0 |
| 004 | OS_A V6.1.4 | RDBv7 | XXX | 3000 | 300000 | 10 | 40 |
| ... | ... | ... | ... | ... | ... | ... | ... |
| 100 | OS_A V6.1.1 | RDBv6 | YYY | 100 | 1000000 | 1000 | 200 |

| TYPE | DRIVER | VERSION | FILE NAME |
|---|---|---|---|
| OS | OS_A | V6.1.5 | osa_6_1_5.img |
| OS | OS_A | V6.1.4 | osa_6_1_4.img |
| OS | OS_B | 6.0 | osb_6_0.img |
| OS | OS_C | 7 | osc7.img |
| DRIVER | HBAdrv | v10.1 | hbadrv_10_1.img |
| DRIVER | NICdrv | v10.1 | nicdrv_10_1.img |
| MIDDLEWARE | RDB | v8.0 | rdb_v8_0.img |
| MIDDLEWARE | RDB | v7.0 | rdb_v8_0.img |
| MIDDLEWARE | WebServer | v4 | webserv_v4.img |

COMPUTER SYSTEM, COMPUTER SYSTEM INFORMATION PROCESSING METHOD, AND INFORMATION PROCESSING PROGRAM

TECHNICAL FIELD

The present invention relates to: a computer system including a plurality of server systems for processing data and a management server for managing each server system; and an information processing method and information processing program for the computer system.

BACKGROUND ART

When managing computer devices for processing data, such as personal computers and server systems, in accordance with programs, software mounted in the computer devices may be updated. In this case, for example, optimum software may be selected from a plurality of pieces of software based on vendor information and an administrator's experiences.

However, when selecting the optimum software from the plurality of pieces of software, it is necessary to consider dependency between currently mounted software and new software and dependency between hardware and new software. So, sometimes great amounts of time and cost are spent for verification to select the optimum software.

Accordingly, a software update assisting device is suggested wherein the software update assisting device judges whether or not a combination of versions of software already installed at a personal computer is a combination of guaranteed version information, when updating the software; and if it is the combination of the guaranteed version information, the software update assisting device judges whether it is a latest software combination or not; and if it not the combination of the guaranteed version information, the software update assisting device downloads necessary software from a management server and updates the software so that the software combination will become a combination of the version information whose operations are guaranteed (see Patent Literature 1).

If this device is used when updating software, it is possible to update the existing software so that a combination of the software, which is already incorporated into the device, and new software becomes optimum.

CITATION LIST

Patent Literature

[Patent Literature 1] Japanese Patent Application Laid-Open (Kokai) Publication No. 2009-230398

SUMMARY OF INVENTION

Problems to be Solved by the Invention

With the device described in Patent Literature 1, the existing software is updated so that it will become the combination of the version information whose operations are guaranteed. However, there is no guarantee that the combination of the version information whose operations are guaranteed is always a stable combination. For example, if a combination of hardware and software is considered, reliance on experiences becomes a more important factor in order to construct a stable system.

The present invention was devised in light of the problems of the conventional technology and it is an object of the invention to provide: a computer system capable of deciding software, which matches a hardware configuration, based on operation achievements of a plurality of server systems when updating the software; and an computer system information processing method and information processing program for the computer system.

Means for Solving the Problems

In order to achieve the above-described object, provided according to the present invention is a computer system comprising a plurality of server systems for processing data and a management server for managing each server system by sending and receiving information to and from each server system via a network, wherein the management server: acquires software configuration information indicating a software configuration about software mounted in each server system, hardware configuration information indicating a hardware configuration of each server system, and operation achievement information indicating operation achievements of each server system from each server system; generates and retains server operation achievement information for managing operation achievements of each server system based on each acquired information; and decides software configuration information, which matches a hardware configuration of a requestor server system, which issues a software configuration decision request, based on the retained server operation achievement information upon receipt of the software configuration decision request from the requestor server system among the plurality of server systems.

Advantageous Effects of Invention

When updating software, it is possible according to the present invention to decide software, which matches the hardware configuration, based on operation achievements of a plurality of server systems.

BRIEF DESCRIPTION OF DRAWINGS

FIG. 5 is a configuration diagram of a software configuration table.
FIG. 6 is a configuration diagram of an important item table.
FIG. 7 is a configuration diagram of a server configuration table.
FIG. 8 is a configuration diagram of a server operation achievement table.
FIG. 9 is a configuration diagram of an SW configuration ID management table.
FIG. 10 is a configuration diagram of an HW configuration ID management table.
FIG. 11 is a configuration diagram of a software security problem management table.
FIG. 12 is a configuration diagram of a server operation achievement statistic table.
FIG. 13 is a configuration diagram of a filtered server operation achievement statistic table.

FIG. 14 is a configuration diagram of a software update data management table.

DESCRIPTION OF EMBODIMENTS

This embodiment is designed to decide software, which matches a hardware configuration, based on operation achievements of a plurality of server systems when updating the software.

An embodiment of the present invention will be explained below with reference to the relevant drawings.

Figure 1:
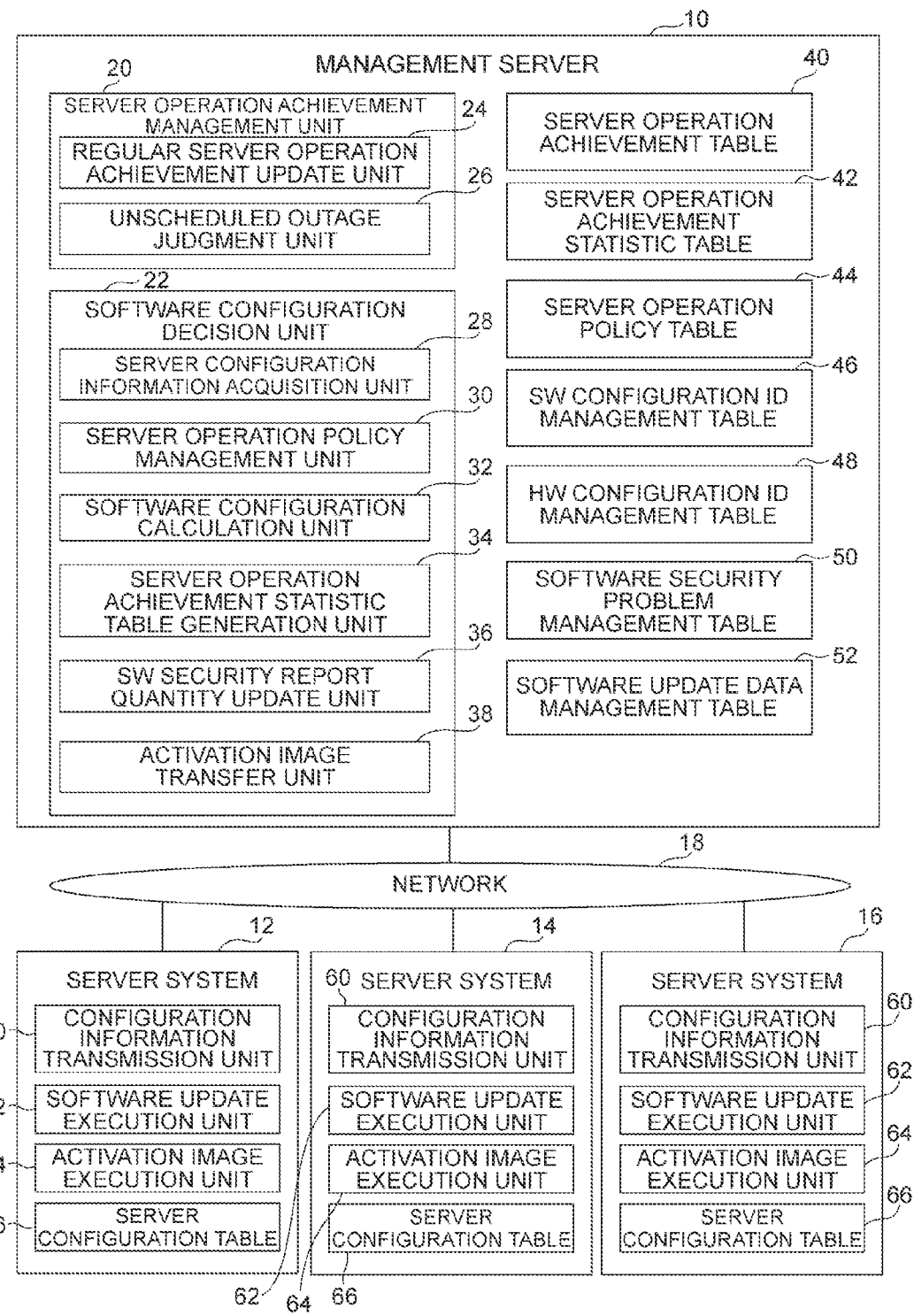
FIG. 1 is a block diagram of a computer system illustrating an embodiment of the present invention.

FIG. 1 is a block diagram of a computer system according to an embodiment of the present invention. Referring to FIG. 1, the computer system includes a management server 10, a plurality of server systems 12, 14, 16, and a network 18 and the management server 10 is connected via the network 18 to each server system 12, 14, 16.

Incidentally, for example, a LAN (Local Area Network) can be used as the network 18. Moreover, a vendor device (not shown in the drawing) managed by a vendor is connected to the network 18 via, for example, the Internet.

The management server 10 includes a server operation achievement management unit 20 and a software configuration decision unit 22; and the server operation achievement management unit 20 includes a regular server operation achievement update unit 24 and an unscheduled outage judgment unit 26.

The software configuration decision unit 22 includes a server configuration information acquisition unit 28, a server operation policy management unit 30, a software configuration calculation unit 32, a server operation achievement statistic table generation unit 34, and an SW (SoftWare) security report quantity update unit 36, and an activation image transfer unit 38.

Moreover, the management server 10 is equipped with, as tables for managing various information, a server operation achievement table 40, a server operation achievement statistic table 42, a server operation policy table 44, an SW configuration ID (IDentifier) management table 46, an HW (HardWare) configuration ID management table 48, a software security problem management table 50, and a software update data management table 52.

Each server system 12, 14, 16 includes a configuration information transmission unit 60, a software update execution unit 62, an activation image execution unit 64, and a server configuration table 66.

Figure 2:
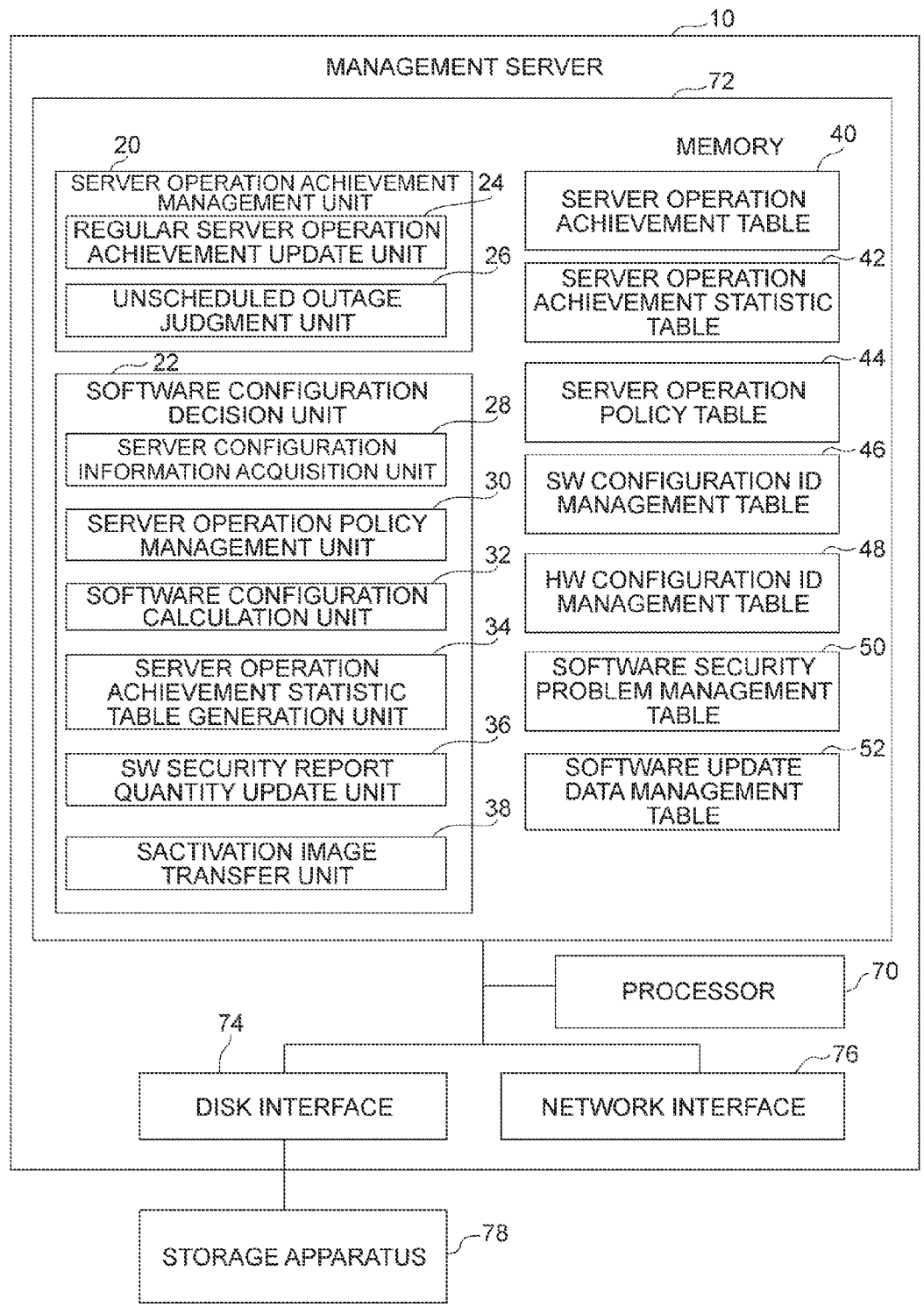
FIG. 2 is a block diagram of a management server.

Next, FIG. 2 illustrates a block configuration diagram of the management server.

Referring to FIG. 2, the management server 10 is composed of a computer including a processor 70, a memory 72, a disk interface 74, and a network interface 76. The disk interface 74 is connected to a storage apparatus 78 and the network interface 76 is connected to the network 18.

The processor 70 supervises and controls the entire management server 10 and sends/receives information to/from each server system 12 to 16 via the network interface 76 and the network 18 by executing processing for managing each server system 12 to 16 based on various programs and information stored in the memory 72.

Furthermore, the processor 70 controls input/output of data to/from the storage apparatus 80 via the disk interface 74.

The memory 72 stores the server operation achievement management unit 20 and the software configuration decision unit 22 as programs for managing each server system 12 to 16. The server operation achievement management unit 20 includes the regular server operation achievement update unit 24 and the unscheduled outage judgment unit 26. The software configuration decision unit 22 includes the server configuration information acquisition unit 28, the server operation policy management unit 30, the software configuration calculation unit 32, the server operation achievement statistic table generation unit 34, the SW security report quantity update unit 36, and the activation image transfer unit 38.

Moreover, the memory 72 stores the server operation achievement table 40, the server operation achievement statistic table 42, the server operation policy table 44, the SW configuration ID management table 46, the HW configuration ID management table 48, the software security problem management table 50, and the software update data management table 52.

Figure 3:
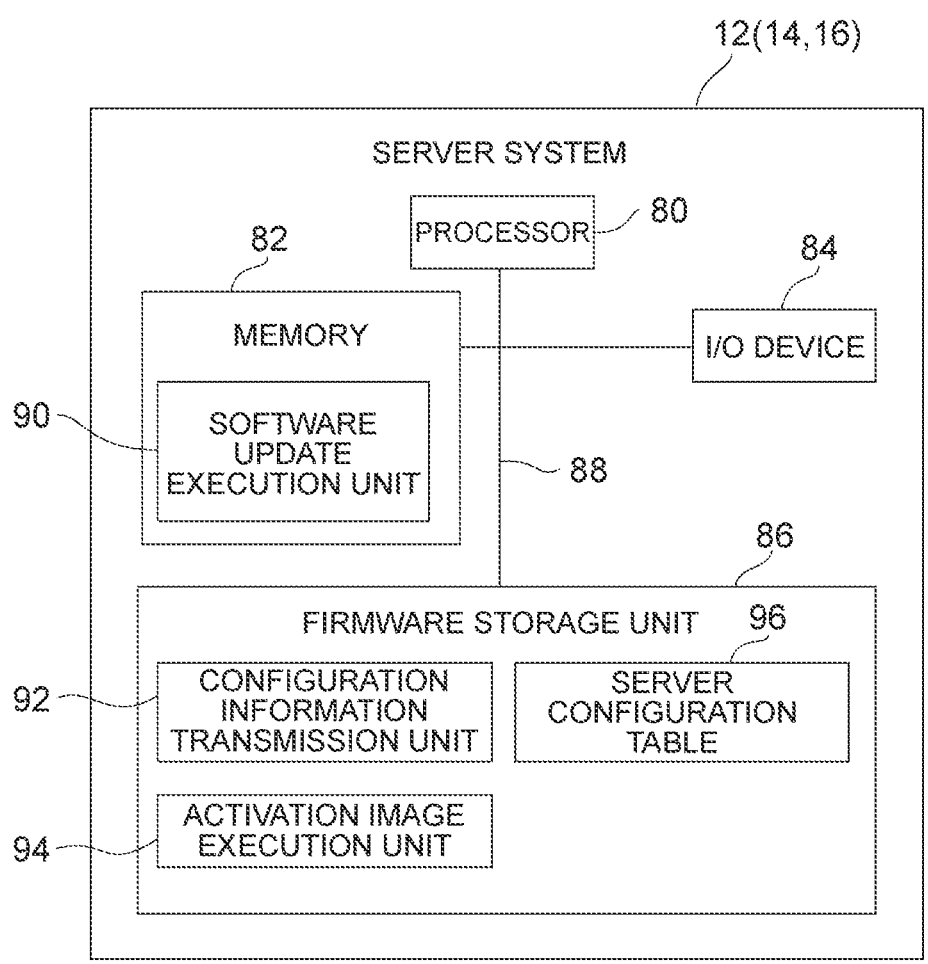
FIG. 3 is a block diagram of a server system.

Next, FIG. 3 illustrates a block diagram of the server system.

Referring to FIG. 3, each server system 12 to 16 is composed of a computer including a processor 80 for supervising and controlling the entire server system, a memory 82, an I/O (Input/Output) device 84, and a firmware storage unit 86 and the respective parts are connected via an internal bus 88.

The memory 82 stores a software update execution unit 90 as a program. The firmware storage unit 86 includes a configuration information transmission unit 92, an activation image execution unit 94, and a server configuration table 96.

Figure 4:
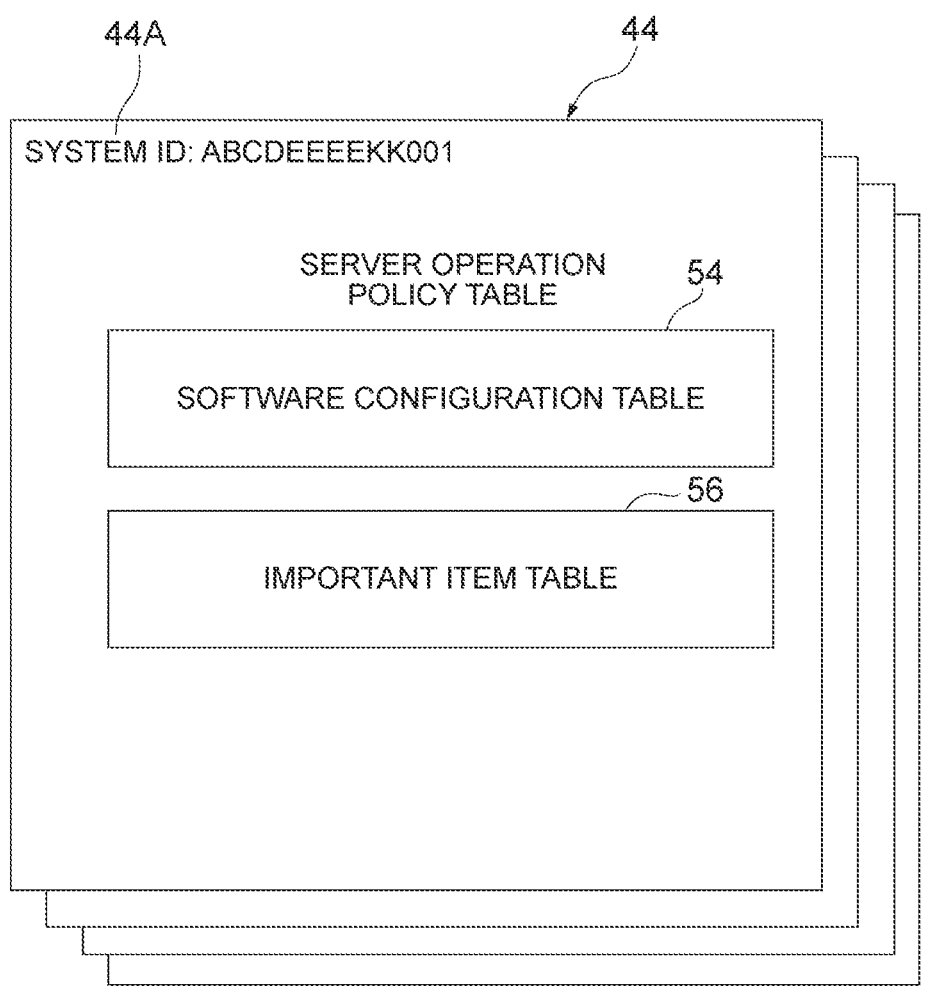
FIG. 4 is a configuration diagram of a server operation policy table.

Next, FIG. 4 illustrates a configuration diagram of a server operation policy table.

Referring to FIG. 4, the server operation policy table 44 is a table assigned to each server system and includes a software configuration table 54 and an important item table 56. Various information is registered in the software configuration table 54 and the important item table 56 in advance by an administrator of each server system 12 to 16. A system ID 44A which is an identifier for identifying each server system 12 to 16 is assigned to the server operation policy table 44 corresponding to each server system 12 to 16.

For example, "ABCDEEEEKK001" is assigned as the system ID 44A to the server operation policy table 44 used for the server system 12.

Next, FIG. 5 illustrates a configuration diagram of a software configuration table.

Referring to FIG. 5, the software configuration table 54 is a table for managing software (SW) mounted in each server system 12 to 16 and is constituted from a software configuration 54A and a server characteristic 54B.

The software configuration 54A includes a type field 54C, a name field 54D, and a version field 54E.

The type is information about the type of the relevant software. Each entry of the type field 54C stores information about OS (operating system), DB (database), and WEB.

The name is information about the name of the relevant software. Each entry of the name field 540 stores information about the name of the relevant software.

For example, an entry corresponding to the OS stores "OS_A" and an entry corresponding to the DB stores "RDB." Incidentally, if the WEB is not required, an entry corresponding to the WEB stores information indicating "None."

The version is information about a version of the relevant software. Each entry of the version field 54E stores information about a version adopted for the software. For example, an entry corresponding to the OS stores information indicating "V6.1." Incidentally, if any version can be used for the DB, an entry corresponding to the DB stores information indicating "Any,"

Moreover, the server characteristic 54B stores, for example, information indicating "DB Server."

Next, FIG. 6 illustrates a configuration diagram of an important item table.

Referring to FIG. 6, the important item table 56 is a table for managing important items emphasized when updating the software and includes an important item 56A; and the important item 56A is constituted form a priority field 56B, an item field 56C, and an exclusion condition field 56D.

The priority is information indicating the priority of important items emphasized when updating the software. Each entry of the priority field 56B stores numbers "1," "2," and "3" in descending order of priority.

The item is information indicating important items emphasized when updating the software. Each entry of the item field 56C stores information indicating "average operation time," "number of times of unscheduled outage," and "security report" in descending order of priority.

The exclusion condition is information meaning that if the relevant item becomes equal to or more than a set numerical value, that item will not be adopted. Each entry of the exclusion condition field 56D stores the number indicating an upper limit beyond which the information registered in the item field 56C will not be adopted.

For example, when the average operation time is not adopted as an important item if the average operation time is 10 hours or more, an entry corresponding to the average operation time stores "10." Moreover, when the number of times of unscheduled outage is not adopted as an important item if the number of times of unscheduled outage is 1000 times or more, an entry corresponding to the number of times of unscheduled outage stores "1000." Incidentally, if an entry of the exclusion condition field 56D stores "-", this means that the relevant item will not be a target of the exclusion condition.

Moreover, the average operation time is a value indicating an average value of measured time obtained by measuring operation time from the start of operation of the software. The longer the average operation time is the more stable the software is.

The number of times of unscheduled outage is the number of times when the software has stopped due to abnormality of the system. The smaller the number of times of unscheduled outage is, the more stable the system is.

The security report is information about security reports disclosed by a software vendor at, for example, a communication site.

Next, FIG. 7 illustrates a configuration diagram of a server configuration table.

Referring to FIG. 7, the server configuration table 66 is a table for managing the configuration of each server system 12 to 16 and is constituted from a system ID 66A an HW configuration ID 66B, a machine type 66O, a processor 66D, a memory 66E, an NIC (Network Interface Card) 66F, and an HBA (Host Bus Adapter) 66G.

The system ID 66A stores information about an identifier such as "ABCDEEEEKK002" for identifying each server system 12 to 16.

The HW configuration ID 66B stores an identifier such as "001" for identifying software of each server system 12 to 16.

The machine type 66O stores information such as "Server_A70" for identifying a machine type used for each server system 12 to 16.

The processor 66D stores information such as "Proc_F" for identifying a processor used for each server system 12 to 16.

The memory 66E stores information such as "16 GB" about the capacity of a memory used for each server system 12 to 16.

The NIC 66F stores information such as "PCIe 10 Gbps" for identifying an NI used for each server system 12 to 16.

The HBA 66G stores information such as "HBA_C" for identifying an HBA used for each server system 12 to 16.

Next, FIG. 8 illustrates a configuration diagram of a server operation achievement table.

Referring to FIG. 8, the server operation achievement table 40 is a table for managing operation achievements of each server system 12 to 16 and is constituted from a system ID field 40A, an HW configuration ID field 40B, an SW configuration ID field 40C, a server characteristic field 40D, an operation time field 40E, a number-of-times-of-unscheduled-outage field 40F, an activation date and time field 40G, a last stop date and time field 40H, and a status field 40I.

The system ID is information about an identifier for identifying a' system mounted in each server system 12 to 16. Each entry of the system ID field 40A stores an identifier such as "ABCDEEEEKK002" for identifying the system mounted in each server system 12 to 16.

The HW configuration ID is an identifier for identifying the hardware (HW) configuration of each server system 12 to 16. Each entry of the HW configuration ID field 40B stores an identifier such as "001" for identifying the hardware configuration of each server system 12 to 16.

The SW configuration ID is information for identifying the software (SW) configuration mounted in each server system 12 to 16. Each entry of the SW configuration ID field 40C stores information such as "001" for identifying the software configuration mounted in each server system 12 to 16.

The server characteristic is information about a characteristic of each server system 12 to 16. Each entry of the server characteristic field 40D stores information such as "DB" about a server characteristic used for each server system 12 to 16.

The operation time is information indicating operation time of each server system 12 to 16 from the start of activation to normal stop. Each entry of the operation time field 40E stores operation time, such as "10000," of each server system 12 to 16.

The number of times of unscheduled outage is information indicating the number of times each server system 12 to 16 has stopped in an unscheduled manner. For example, it is the number of times each server system 12 to 16 has received a re-activation start notice after the start of activation without the normal stop. Each entry of the number-of-times-of-unscheduled-outage field 40F stores information about the number of times each server system 12 to 16 has stopped in an unscheduled manner. For example, if a certain server system has stopped once, an entry corresponding to this server system stores information indicating "1."

The activation date and time is information about a date and time when each server system 12 to 16 was activated. Each entry of the activation date and time field 40G stores the date and time when each server system 12 to 16 was activated, together with the year, month, and date of activation.

The last stop date and time is information about a date and time when each server system 12 to 16 stopped last time. Each entry of the last stop date and time field 40H stores the date and time when each server system 12 to 16 stopped last time, together with the year, month, and date of last stop.

The status is information indicating whether each server system 12 to 16 is in an active state or not. Each entry of the status field 40I stores: "Active" when each server system 12 to 16 is in an active state; and "Stopped" when the operation of each server system 12 to 16 is stopped.

Next, FIG. 9 illustrates a configuration diagram of an SW configuration ID management table.

Referring to FIG. 9, the SW configuration ID management table 46 is a table for managing the software configuration mounted in each server system 12 to 16 and is constituted from an SW configuration ID field 46A, an OS field 46, a DB field 46C, a WEB field 46D, an HBA driver field 46E, and an NIC driver field 46F.

The SW configuration ID is information about an identifier for identifying a software configuration mounted in each server system 12 to 16. Each entry of the SW configuration ID field 46A stores the identifier such as "001" for identifying the software configuration.

The OS is information about an identifier for identifying an OS mounted in each server system 12 to 16. Each entry of the OS field 46B stores the identifier such as "OS_A V6.1.5" for identifying the OS mounted in each server system 12 to 16.

The DB is information about an identifier for identifying a database (DB) mounted in each server system 12 to 16. Each entry of the DB field 46C stores the identifier such as "RDBv8" for identifying the database.

The WEB is information about an identifier for identifying a WEB. Each entry of the WEB field 46D stores the identifier such as "YYY" for identifying the WEB adopted by each server system 12 to 16.

The HBA driver is information about an identifier for identifying an HBA driver used for each server system 12 to 16. Each entry of the HBA driver field 46E stores the identifier such as "HBAdrv v10.1" for identifying the HBA driver.

The NIC driver is information about an identifier for identifying an NIC driver used for each server system 12 to 16. Each entry of the NIC driver field 46F stores the identifier such as "NICdrv v10.1" for identifying the NIC driver.

Next, FIG. 10 illustrates a configuration diagram of an HW configuration ID management table.

Referring to FIG. 10, the HW configuration ID management table 48 is a table for managing the hardware (HW) configuration of each server system 12 to 16 and is constituted from an HW configuration ID field 48A, a machine type field 48B, a processor field 48C, a memory field 48D, an HBA field 48E, and an NIC field 48F.

The HW configuration ID is information about an identifier for identifying the hardware configuration of each server system 12 to 16. Each entry of the HW configuration ID field 48A stores the identifier such as "001" for identifying the hardware configuration of each server system 12 to 16.

The machine type is information about a machine type comprising the hardware of each server system 12 to 16. Each entry of the machine type field 48B stores the identifier such as "Server_A 70" for identifying the machine type.

The processor is information for identifying a processor mounted in each server system 12 to 16. Each entry of the processor field 48C stores the identifier such as "Proc_F" for identifying the processor.

The memory is information about the capacity of the memory 82 used for each server system 12 to 16. Each entry of the memory field 48D stores the capacity of the memory 82, such as "16 GB," used for each server system 12 to 16.

The HBA is information about an identifier for identifying an HBA used for each server system 12 to 1. Each entry of the HBA field 48E stores the identifier such as "HBA_C" for identifying, the HBA.

The NIC is information for identifying, an NIC used for each server system 12 to 16. Each entry of the NIC field 48F stores the identifier such as "PCIe 10 Gbps" for identifying the NIC.

Next, FIG. 11 illustrates a configuration diagram of a software security problem management table.

Referring to FIG. 11, the software security problem management table 50 is a table for managing security problems of the software mounted in each server system 12 to 16 and is constituted from an SW ID field 50A, a software name field 50B, a number-of-security-problem-reports field 50C, and a publication date and time field 50D.

The SW ID is information about an identifier for identifying software mounted in each server system 12 to 16. Each entry of the SW ID field 50A stores the identifier such as "001" for identifying the software.

The software name is information about the name of the software mounted in each server system 12 to 16. Each entry of the software name field 50B stores the name of the software such as "OS_A V6.1.5."

The number of security problem reports is information indicating the number of times security problems of the software were reported from a vendor device to each server system 12 to 16. Each entry of the number-of-security-problem-reports field 50C stores the number of times, such as "2," the security problems were reported from the vendor device.

The publication date and time is information about a date and time when software with a security problem was publicized at a communication site. Each entry of the publication date and time field 50D stores the date and time when the software with a security problem was publicized, together with the year, month, and date of publication.

Next, FIG. 12 illustrates a configuration diagram of a server operation achievement statistic table.

Referring to FIG. 12, the server operation achievement statistic table 42 is a table for statistically managing operation achievements of each server system 12 to 16 and is constituted from an SW configuration field 42A, an OS field 42B, a DB field 42C, a WEB field 42D, a number-of-active-software-programs field 42E, an average operation time field 42F, a number-of-times-of-unscheduled-outage field 42G, and a security report field 42H.

The SW configuration is information about an identifier for identifying the software configuration mounted in each server system 12 to 16. Each entry of the SW configuration field 42A stores the identifier such as "001" for identifying the software configuration.

The OS is information about an identifier for identifying an OS mounted in each server system 12 to 16. Each entry of the OS field 42B stores the identifier such as "OS_A V6.1.5" for identifying the OS.

The DB is information about an identifier for identifying a database (DB) mounted in each server system 12 to 16. Each entry of the DB field 42C stores the identifier such as "RDBv8" for identifying the DB.

The WEB is information about an identifier for identifying a WEB used for each server system 12 to 16. Each entry of the WEB field 42D stores the identifier such as "YYY" for identifying the WEB.

The number of active software programs is information about the number of active software mounted in each server system 12 to 16. Each entry of the number-of-active-software-programs field 42E stores the number of active software, such as "2000."

The average operation time is information about average operation time indicating an average value of operation time when the software mounted in each server system 12 to 16 is active. Each entry of the average operation time field 42F stores the average operation time such as "400000" of the software mounted in each server system 12 to 16.

The number of times of unscheduled outage is information indicating the number of times each server system 12 to 16 has stopped in an unscheduled manner. Each entry of the number-of-times-of-unscheduled-outage field 42G stores the number of times each server system 12 to 16 has stopped in an unscheduled manner, for example, "300."

The security report is information indicating the number of times security problems of the software were reported from the vendor device to each server system 12 to 16. Each entry of the number-of-security-problem-reports field 42H stores the number of times, such as "20," the security problems of the software were reported from the vendor device.

Next, FIG. 13 illustrates a configuration diagram of a filtered server operation achievement statistic table.

Referring to FIG. 13, a filtered server operation achievement statistic table 420 is a table for statistically managing operation achievements of each server system 12 to 16 and is constituted from an SW configuration field 420A, an OS field 420B, a DB field 420C, a WEB field 420D, a number-of-active-software-programs field 420E, an average operation time field 420F, a number-of-times-of-unscheduled-outage field 420G, and a security report field 420H.

The SW configuration is information about an identifier for identifying the software configuration mounted in each server system 12 to 16. Each entry of the SW configuration field 420A stores the identifier such as "001" for identifying the software configuration.

The OS is information about an identifier for identifying an OS mounted in each server system 12 to 16. Each entry of the OS field 420B stores the identifier such as "OS_A V6.1.5" for identifying the OS.

The DB is information about an identifier for identifying a database (DB) mounted in each server system 12 to 16. Each entry of the DB field 420C stores the identifier such as "RDBv8" for identifying the database.

The WEB is information about a WEB used for each server system 12 to 16. Each entry of the WEB field 420D stores the identifier such as "YYY" for identifying the WEB.

The number of active software programs is information about the number of active software mounted in each server system 12 to 16. Each entry of the number-of-active-software-programs field 420E stores the number of active software, for example, "10."

The average operation time is information about average operation time indicating an average value of operation time when the software mounted in each server system 12 to 16 is active. Each entry of the average operation time field 420F stores the average operation time such as "100" of the software mounted in each server system 12 to 16.

The number of times of unscheduled outage is information indicating the number of times each server system 12 to 16 has stopped in an unscheduled manner. Each entry of the number-of-times-of-unscheduled-outage field 420G stores the number of times each server system 12 to 16 has stopped in an unscheduled manner, for example, "300."

The security report is information indicating the number of times security problems of the software were reported from the vendor device to each server system 12 to 16. Each entry of the number-of-security-problem-reports field 420H stores the number of times, such as "20," the security problems were reported from the vendor device.

Next, FIG. 14 illustrates a configuration diagram of a software update data management table.

Referring to FIG. 14, the software update data management table 52 is a table for managing data when updating the software mounted in each server system 12 to 16 and is constituted from a type field 52A, a name field 52B, a version field 52C, and a file name field 52D.

The type is information for identifying the type of software mounted in each server system 12 to 16. Each entry of the type field 52A stores: an "OS" when the OS is mounted as the software mounted in each server system 12 to 16; a "driver" when the driver is mounted; and "middleware" when the middleware is mounted.

The name is information about the name of the relevant software mounted in each server system 12 to 16. Each entry of the name field 52B stores "OS_A" as the name of the OS, "HBAdrv" as the name of the driver, or "RDB" as the name of the middleware.

The version is information about a version of the relevant software mounted in each server system 12 to 16. An entry of the version field 52C, for example, an entry corresponding to the OS, stores "V6.1.5."

The file name is information about a file name of the software mounted in each server system 12 to 16. Each entry of the file name field 520 stores information about the file name of the software mounted in each server system 12 to 16. For example, if "7" is used as a version of the OS, the relevant entry of the file name field 520 stores "osc7.ing."

Figure 15:
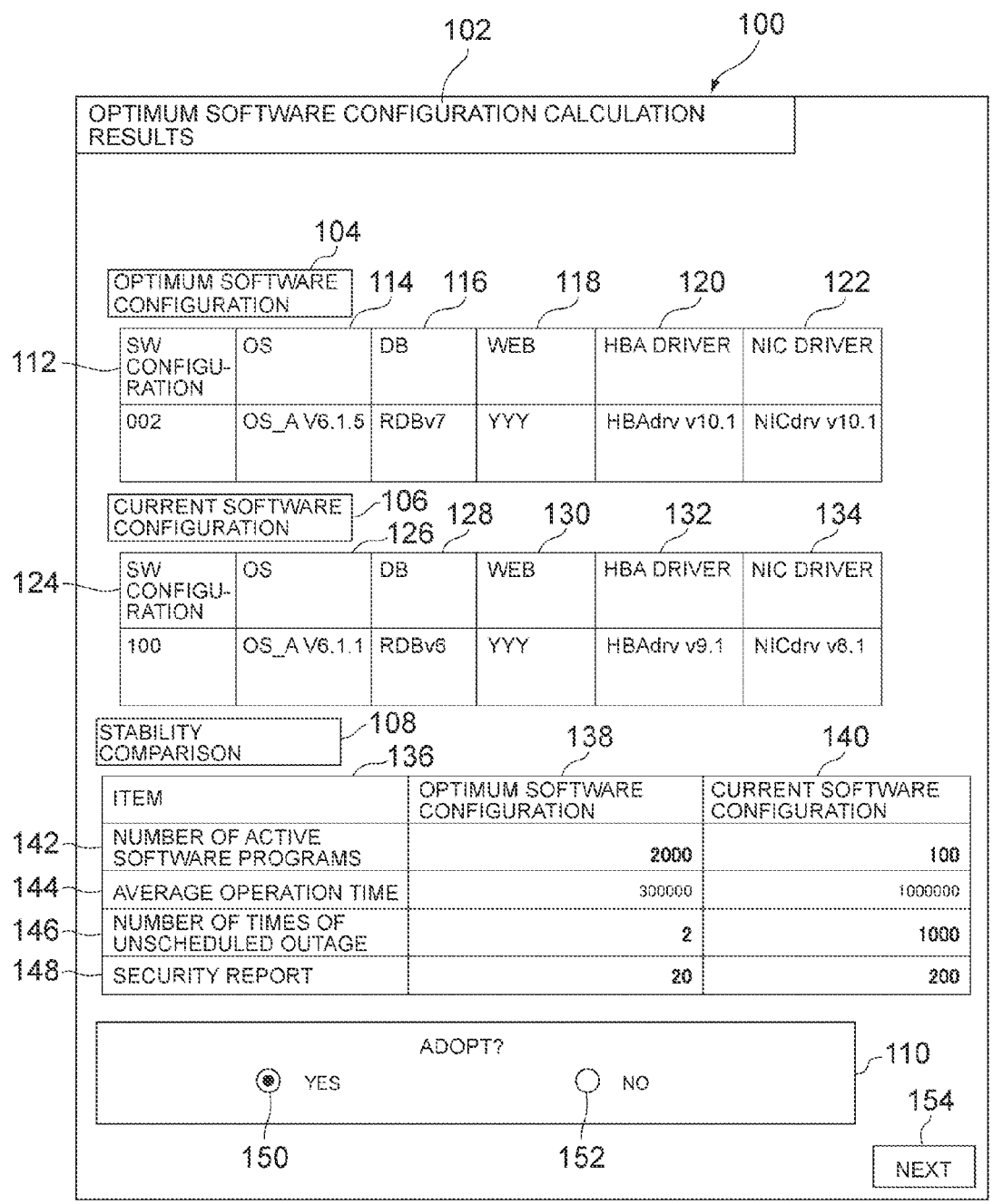
FIG. 15 is a configuration diagram of an optimum software configuration calculation result display screen.

Next, FIG. 15 illustrates a configuration diagram of an optimum software configuration calculation result display screen.

Referring to FIG. 15, an optimum software configuration calculation result display screen 100 is a screen when the calculation results by the management server 10 are displayed on a display screen of any server system of the server systems 12 to 16; and is constituted from optimum software configuration calculation results 102, an optimum software configuration 104, a current software configuration 106, a stability comparison 108, and a selection area 110.

Information about an SW configuration 112, an OS 114, a DB 116, a WEB 118, an HBA driver 120, and an NIC driver 122 is displayed as information about the optimum software configuration calculation results in a display area of the optimum software configuration 104.

For example, if software with identifier "002" is selected as the optimum software configuration by the management server 10, "OS_A V6.1.5" is displayed in the OS 114, "RDBv7" is displayed in the DB 116, "YYY" is displayed in the WEB 118, "HBAdrv v10.1" is displayed in the HBA driver 120, and "NICdrv v10.1" is displayed in the NIC driver 122 as information about the software configuration identified with the identifier "002."

Information about an SW configuration 124, an OS 126, a DB 128, a WEB 130 an HBA driver 132, and an NIC driver 134 is displayed in a display area of the current software configuration 106.

For example, if the identifier of the software currently mounted in any server system of the server systems 12 to 16 is "100," "OS_A V6.1.1" is displayed in the OS 126, "RDBv6" is displayed in the DB 128, "YYY" is displayed in the WEB 130, "HBAdrv v9.1" is displayed in the HBA driver 132, and "NICdrv v8.1" is displayed in the NIC driver 134 as information about the software configuration identified with the identifier "100".

Information about an item 136, an optimum software configuration 138, and a current software configuration 140 are displayed in a display area of the stability comparison 108.

Information about the number of active software programs 142, average operation time 144, the number of times of unscheduled outage 146, and a security report 148 is displayed in each entry of the item 136.

Regarding the optimum software configuration 138, for example, "2000" is displayed as the number of active software programs 142, "300000" is displayed as the average operation time 144, "2" is displayed as the number of times of unscheduled outage 146, and "20" is displayed as the security report 148.

Regarding the current software configuration 140, for example, "100" is displayed as the number of active software programs 142, "1000000" is displayed as the average operation time 144, "1000" is displayed as the number of times of unscheduled outage 146, and "200" is displayed as the security report 148.

Regarding the selection area 110, letters indicating "Adopt?" are displayed; and a selection button 150 for selecting "YES" and a selection button 152 for selecting "NO" are displayed.

Under this circumstance, the administrator or the user who manages each server system 12 to 16 compares the display content of the optimum software configuration 138 with the display content of the current software configuration 140; and if the administrator or the user adopts the display content of the optimum software configuration 138 based on the comparison results, they select the selection button "YES" 150; and if the administrator or the user does not adopt the optimum software configuration 138, it can select the selection button "NO" 152.

On the other hand, if the administrator or the user selects a "Next" button 154, the next selection screen will be displayed on the screen of the server system 12 to 16.

Figure 16:
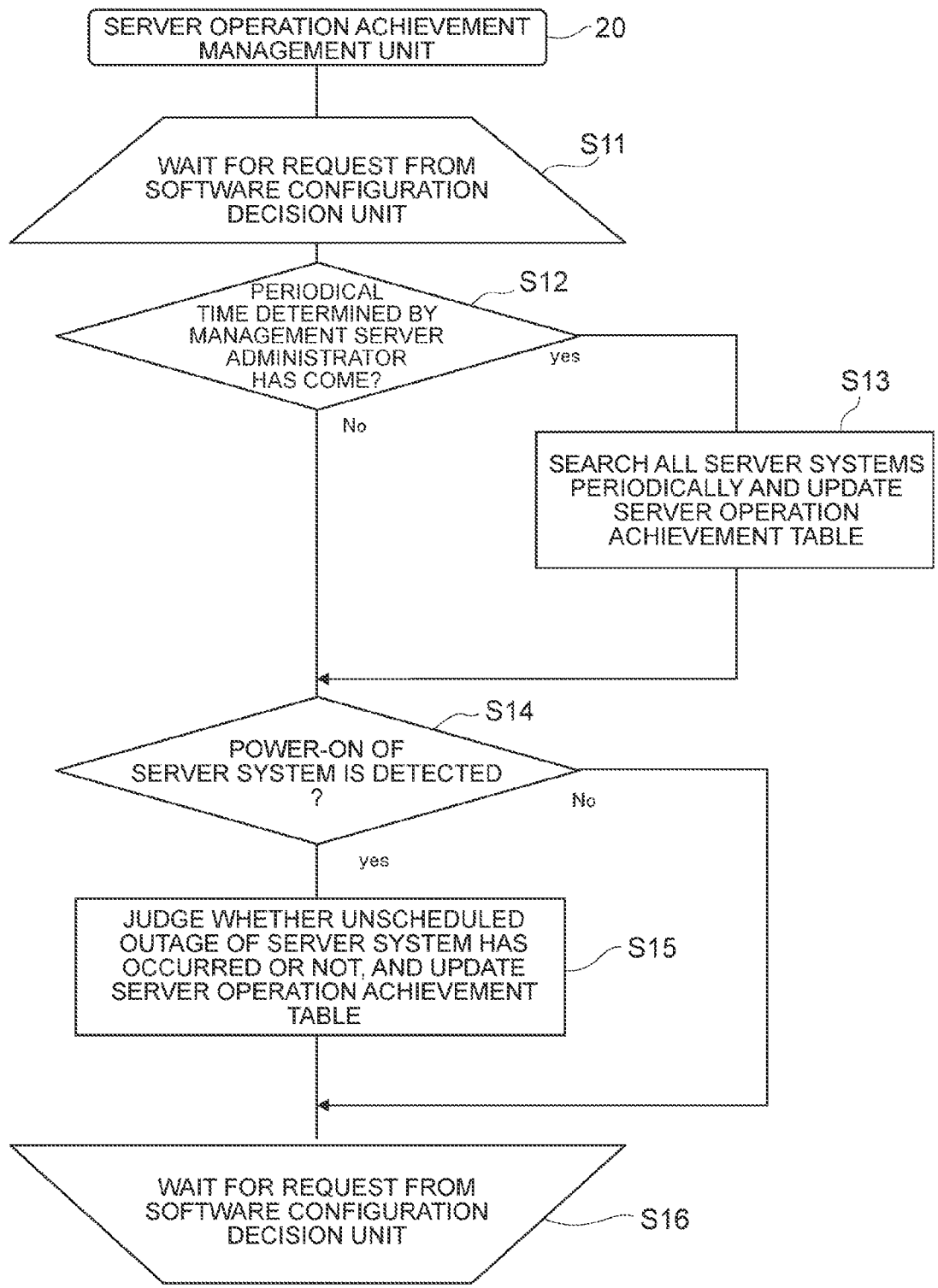
FIG. 16 is a flowchart for explaining processing content by a server operation achievement management unit.

Next, the processing content by the server operation achievement management unit will be explained in accordance with a flow chart of FIG. 16.

The server operation achievement management unit 20 starts the processing by activation of the processor 70, executes processing for waiting for a request from the software configuration decision unit 22, for example, processing for waiting for interrupt notice (S11) and judges whether periodical time determined by the administrator of the management server 10 has come or not (S12).

If the server operation achievement management unit 20 obtains an affirmative judgment result in step S12, it periodically searches the content of the server operation achievement table 40 for all the server systems 12 to 16. For example, if the operation time is changed, the server operation achievement management unit 20 updates the content of the operation time field 40E of the server operation achievement table 40 and proceeds to step S14. If the server operation achievement management unit 20 obtains a negative judgment result in step S12, it judges whether the power-on of each server system 12 to 16 is detected or not (S14).

Next, if the server operation achievement management unit 20 obtains a negative judgment result in step S14, it proceeds to processing in step S16. On the other hand, if the server operation achievement management unit 20 obtains an affirmative judgment result in step S14, it fetches the judgment result of the unscheduled outage judgment unit 26, judges whether an unscheduled outage of each server system 12 to 16 has occurred or not, updates the content of the number-of-times-of-unscheduled-outage field 40F of the server operation achievement table 40 based on this judgment result (S15), then executes processing for waiting for a request from the software configuration decision unit 22 (S16), and repeats the processing from step S11 to step S16 until a termination order is issued from the administrator of the management server 10.

Figure 17:
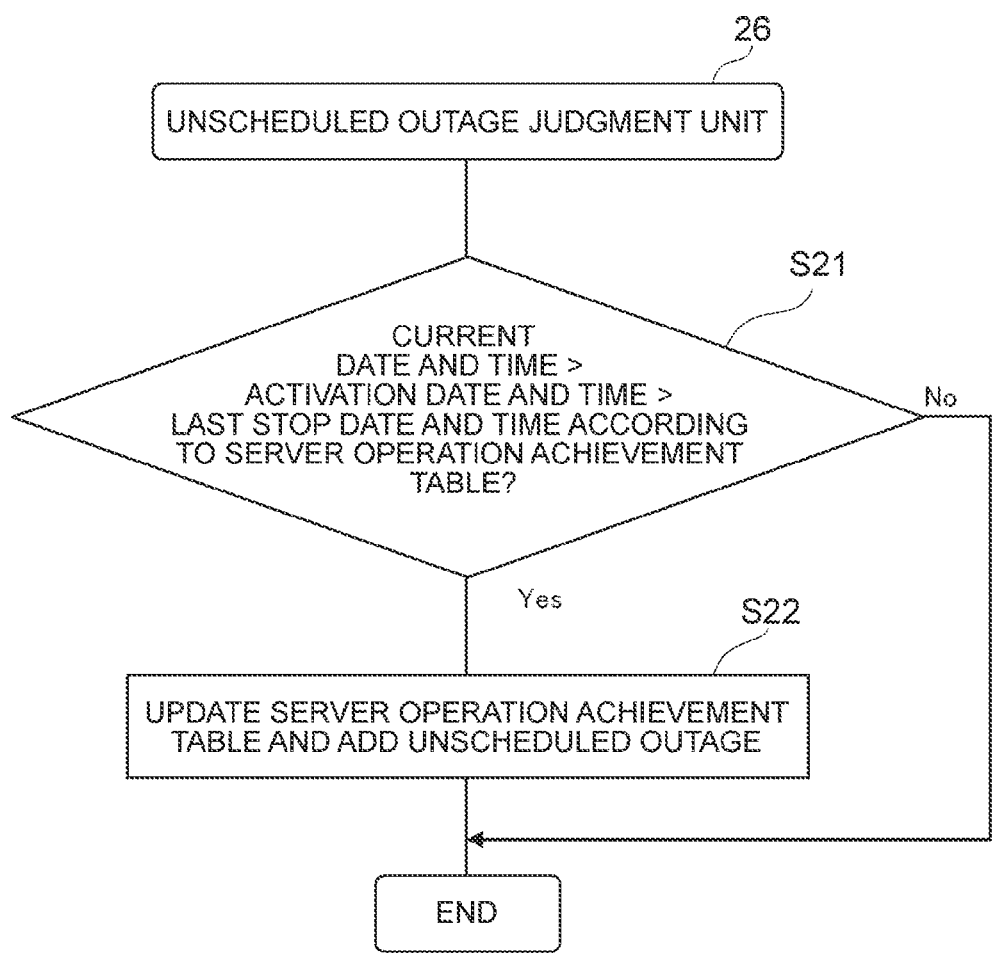
FIG. 17 is a flowchart for explaining processing content by an unscheduled outage judgment unit.

Next, processing of the unscheduled outage judgment unit 26 will be explained in accordance with a flowchart of FIG. 17.

The unscheduled outage judgment unit 26 starts the processing by activation of the server operation achievement management unit 20.

Firstly, the unscheduled outage judgment unit 26 refers to the activation date and time and the last stop date and time in the information recorded in the server operation achievement table 40 based on the current date and time and judges whether or not the following relationship is established: the current date and time>the activation date and time>the last stop date and time (S21).

If the unscheduled outage judgment unit 26 obtains a negative judgment result in step S21, this means there is no activation date and time in the past before the current date and time and, therefore, the unscheduled outage judgment unit 26 terminates the processing in this routine. If the unscheduled outage judgment unit 26 obtains an affirmative judgment result in step S21, this means an unscheduled outage occurred in the past before the current date and time and, therefore, the unscheduled outage judgment unit 26 adds +1 as the number of times of unscheduled outage to the number-of-times-of-unscheduled-outage field 40F of the server operation achievement table 40 (S22) and terminates the processing in this routine.

Figure 18:
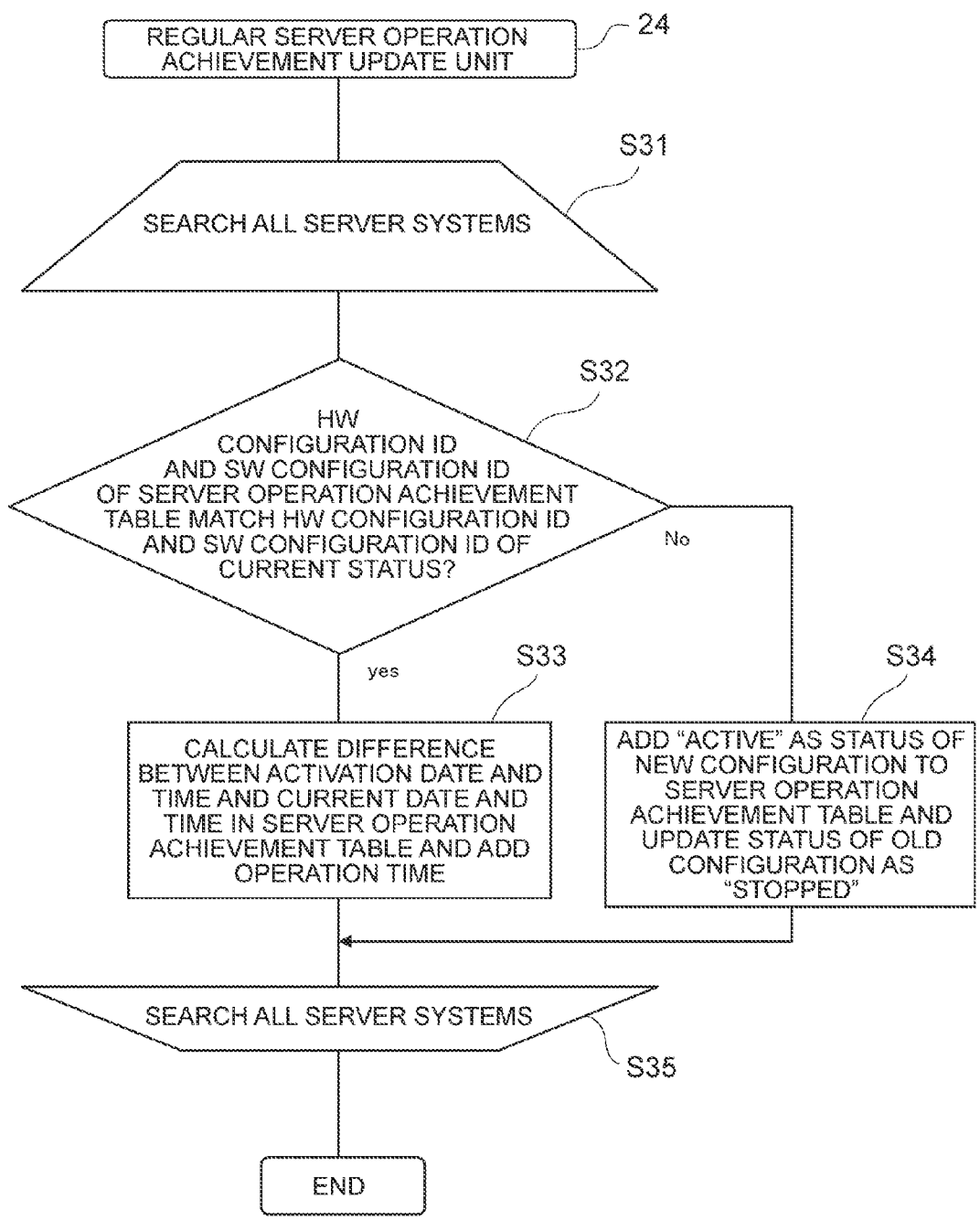
FIG. 18 is a flowchart for explaining processing content by a regular server operation achievement update unit.

Next, the processing content by the regular server operation achievement update unit will be explained in accordance with a flowchart of FIG. 18.

The regular server operation achievement update unit 24 starts the processing by activation of the server operation achievement management unit 20.

Firstly, the regular server operation achievement update unit 24 searches all the server systems 12 to 16 periodically, acquires information about the hardware configuration, the software configuration, and the activation date and time from each server system 12 to 16 (S31), compares the HW configuration ID and SW configuration ID recorded in the server operation achievement table 40 with the current HW configuration ID and SW configuration ID acquired from each server system 12 to 16, and judges whether their content matches each other (S32).

If the regular server operation achievement update unit 24 obtains an affirmative judgment result in step S32, it calculates the difference between the current date and time and the activation date and time recorded in the server operation achievement table 40, registers the calculation result as the operation time in the operation time field 40E of the server operation achievement table 40 (S33), and proceeds to processing of step S35.

If the regular server operation achievement update unit 24 obtains a negative judgment result in step S32, it adds a new entry to the server operation achievement table 40, records the status of the new configuration as "Active" in the status field 40I for the added entry, records the status of the old configuration as "Stopped," and thereby updates the information of the server operation achievement table 40 (S34).

Subsequently, the regular server operation achievement update unit 24 searches all the server systems 12 to 16 (S35) and repeats the processing from step S31 to step S35 until the processing on all the server systems 12 to 16 is completed; and when the processing on all the server systems 12 to 16 is completed, the regular server operation achievement update unit 24 terminates the processing in this routine.

Figure 19:
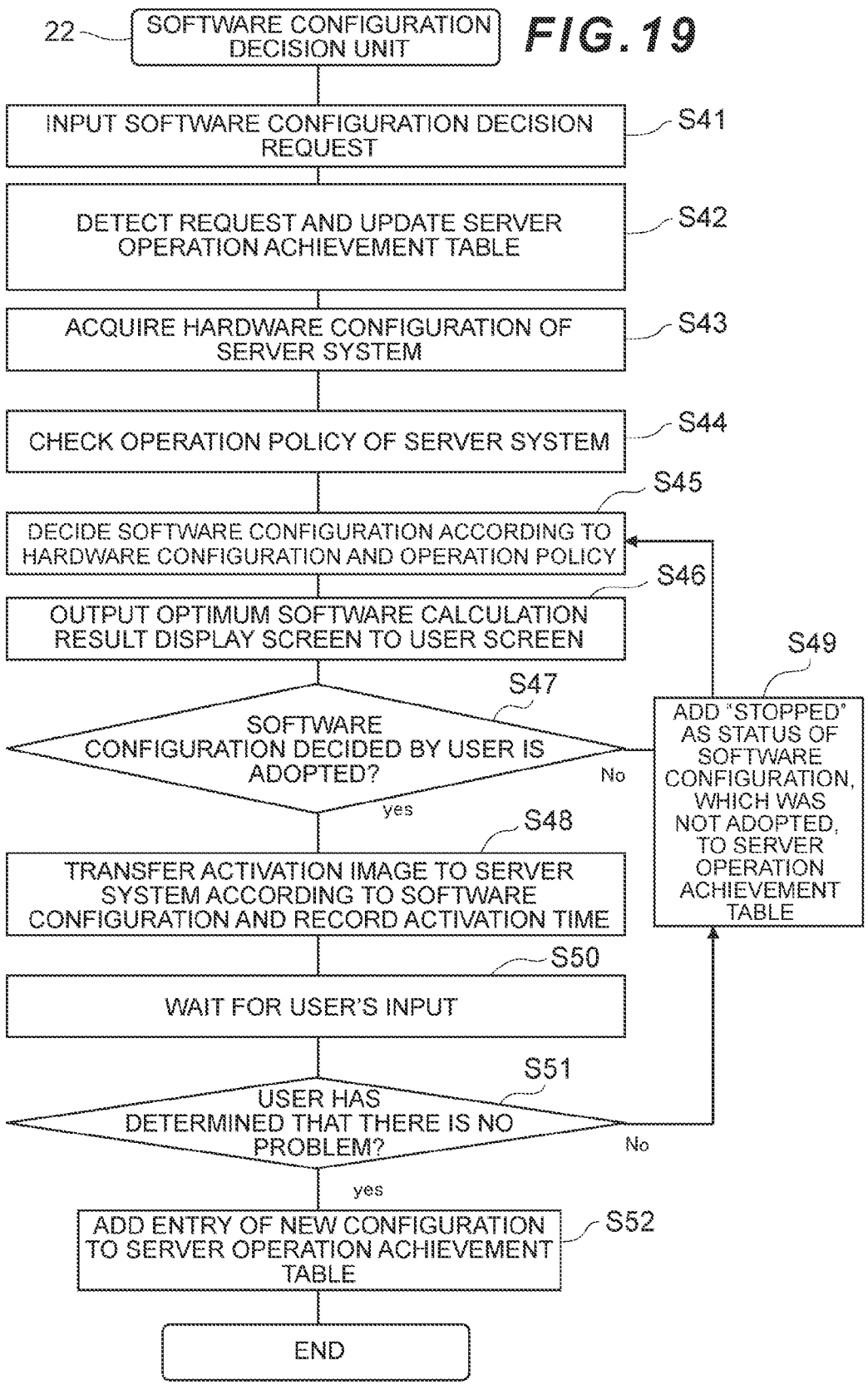
FIG. 19 is a flowchart for explaining processing content by a software configuration decision unit.

Next, the processing content by the software configuration decision unit will be explained in accordance with a flowchart of FIG. 19.

The software configuration decision unit 22 starts the processing by activation of the processor 70.

Firstly, the software configuration decision unit 22 inputs a software configuration decision request from a server system which issues the software configuration decision request (hereinafter sometimes referred to as the requestor server system) among the server systems 12 to 16 (S41); and if the software configuration decision unit 22 detects the request from the requestor server system, it executes processing for updating the server operation achievement table 40 and notifies the server operation achievement management unit 20 of an interrupt (S42).

Subsequently, the software configuration decision unit 22 activates the server configuration information acquisition unit 28 and acquires the hardware configuration from the requestor server system via the server configuration information acquisition unit 28 (S43).

Next, the software configuration decision unit 22 activates the server operation policy management unit 30, refers to the server operation policy table 44 of the requestor server system among the server operation policy tables 44 managed by the server operation policy management unit 30 and checks information registered in the software configuration 54A of the software configuration table 54, information registered in the server characteristic 54B, and information registered in the important item 56A of the important item table 56 as the operation policy of the requestor server system (S44).

Next, the software configuration decision unit 22 activates the software configuration calculation unit 32, executes processing for deciding the optimum software configuration based on the hardware configuration acquired by the server configuration information acquisition unit 28 and the operation policy checked by the server operation policy management unit 30 (S45), and displays information about the decided optimum software configuration on a screen of the optimum software configuration calculation result display screen 100 (S46).

Subsequently, the software configuration decision unit 22 judges whether the user adopts the decided optimum software configuration or not (S47).

If the software configuration decision unit 22 obtains an affirmative judgment result in step S47, that is, if the user operates the selection button 150 for selecting "YES" in the selection area 110 on the optimum software configuration calculation result display screen 100 shown in FIG. 15, the software configuration decision unit 22 activates the activation image transfer unit 38, transfers an activation image according to the decided optimum software configuration to the requestor server system, and records the activation date and time of the requestor server system in the server operation achievement table 40 (S48).

On the other hand, if the software configuration decision unit 22 obtains a negative judgment result in step S47, that is, if the user operates the selection button 152 for selecting "NO" in the selection area 110 on the optimum software configuration calculation result display screen 100, the software configuration decision unit 22 adds an entry to the server operation achievement table 40, registers the status of the optimum software configuration, which is not adopted, as "Stopped" in the added entry (S49), and returns to the processing of step S45.

Next, the software configuration decision unit 22 executes processing on a next screen of the optimum software configuration calculation result display screen 100 for waiting for input by the user, that is, processing for waiting for the user to check activation of the requestor server system as processing after step S48 (S50).

Next, the software configuration decision unit 22 judges whether or not the user has checked the activation of the requestor server system and has confirmed that there is no problem (S51).

If the software configuration decision unit 22 obtains an affirmative judgment result in step S51, that is, if the user performs the operation to confirm that there is no problem, the software configuration decision unit 22 adds an entry for a new configuration to the server operation achievement table 40 (S52) and terminates the processing in this routine.

On the other hand, if the software configuration decision unit 22 obtains a negative judgment result in step S51, that is, if the user performs the operation to confirm that there is a problem, the software configuration decision unit 22 proceeds to the processing of step S49; and after the processing of step S49, the software configuration decision unit 22 repeats the processing from step S45 to step S52.

Figure 20:
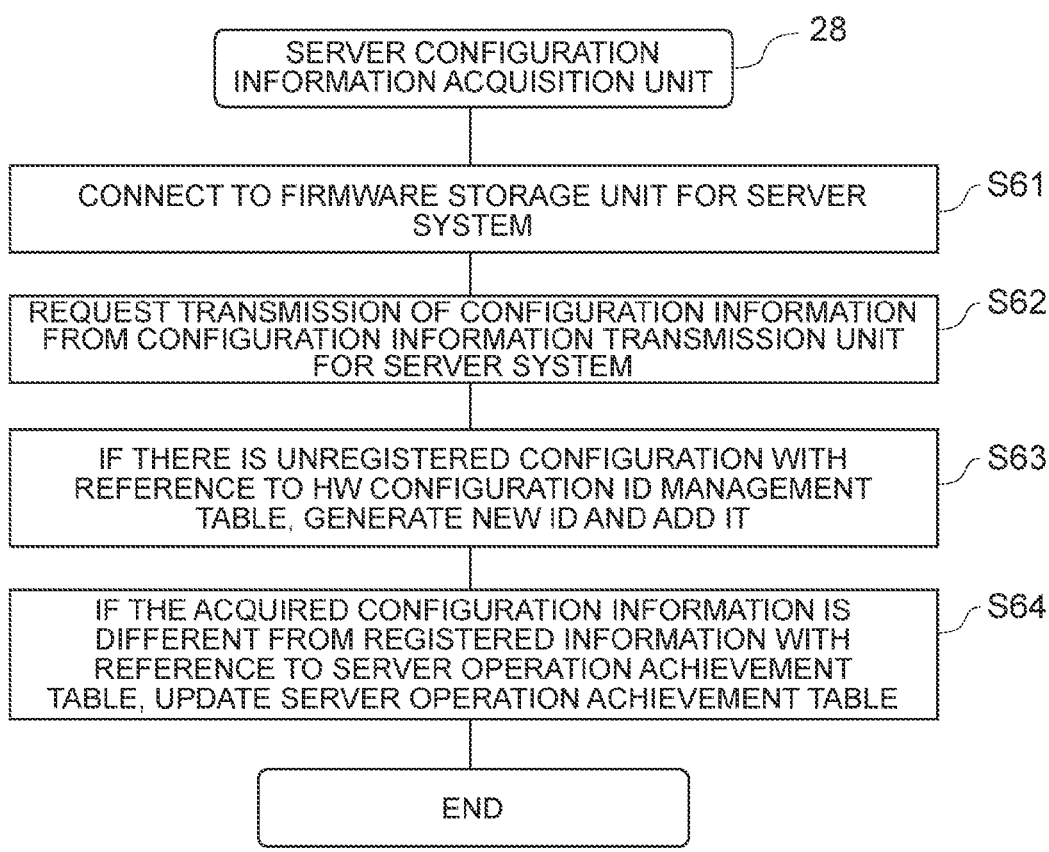
FIG. 20 is a flowchart for explaining processing content by a server configuration information acquisition unit.

Next, the processing content by the server configuration information acquisition unit 28 will be explained in accordance with a flowchart of FIG. 20.

The server configuration information acquisition unit 28 starts the processing by activation of the software configuration decision unit 22.

Firstly, the server configuration information acquisition unit 28 executes processing for connecting to the firmware storage unit 86 for the requestor server system (S61) and requests transmission of the configuration information from the configuration information transmission unit 92 for the requestor server system (S62).

Next, the server configuration information acquisition unit 28 refers to the HW configuration ID management table 48 based on the configuration information sent from the configuration information transmission unit 92 for the requestor server system; and if there is any unregistered configuration, the server configuration information acquisition unit 28 generates a new ID and adds the generated ID to the HW configuration ID management table 48 (S63).

Subsequently, the server configuration information acquisition unit 28 refers to the server operation achievement table 40 of the requestor server system; and if the acquired configuration information is different from information registered in the server operation achievement table 40, the server configuration information acquisition unit 28 updates the information of the server operation achievement table 40 based on the acquired configuration information (S64) and terminates the processing in this routine.

Figure 21:
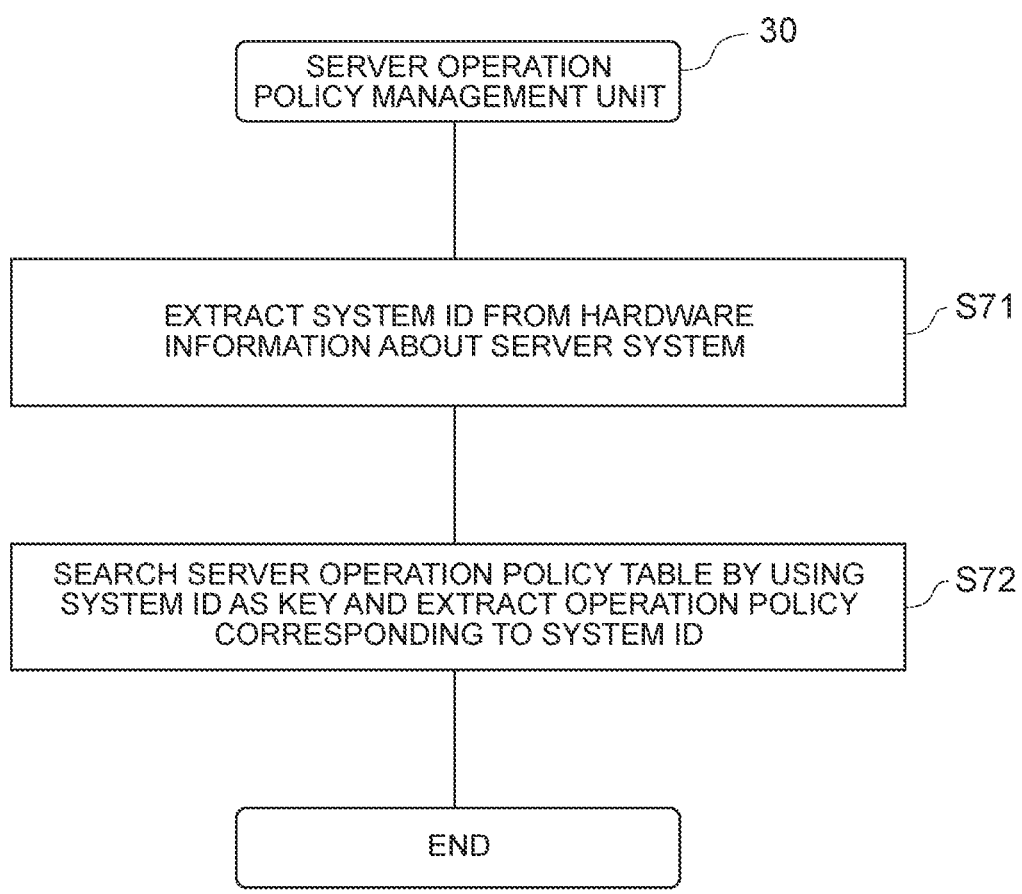
FIG. 21 is a flowchart for explaining processing content by a server operation policy management unit.

Next, the processing content by the server operation policy management unit will be explained in accordance with a flowchart of FIG. 21.

The server operation policy management unit 30 starts the processing by activation of the software configuration decision unit 22.

Firstly, the server operation policy management unit 30 extracts the system ID from hardware information about the requestor server system, for example, the hardware configuration information (S71), searches the system ID 44A of the server operation policy table 44 by using the extracted system ID as a key, extracts the operation policy registered in the operation policy table 44 corresponding to the system ID 44A, for example, information registered in the software configuration table 54 and information registered in the important item table 56 (S72) and terminates the processing in this routine.

Figure 22:
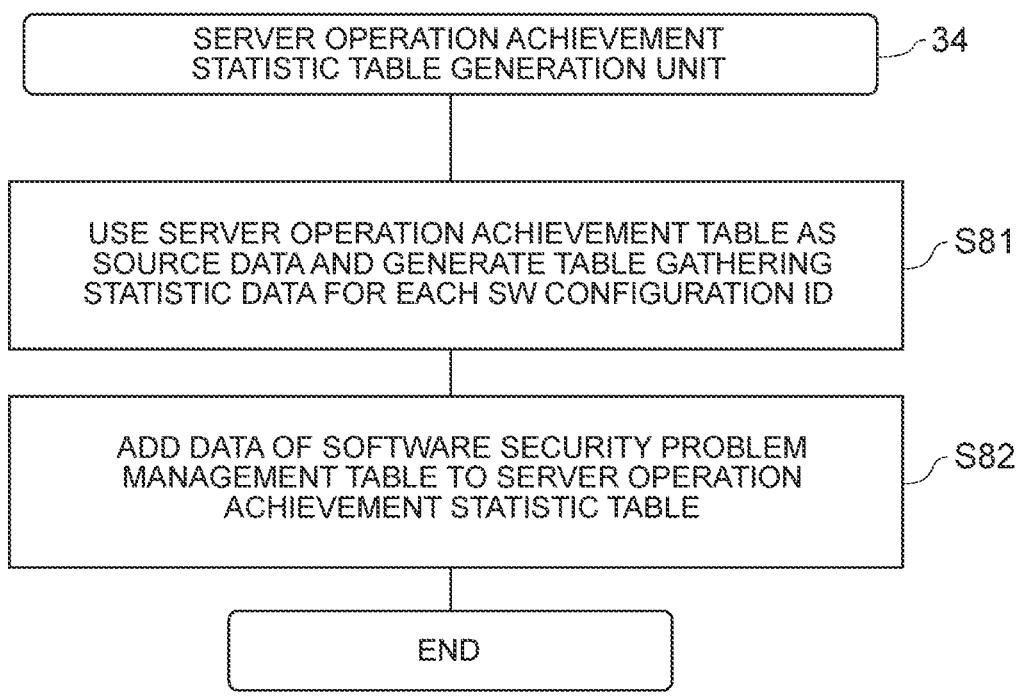
FIG. 22 is a flowchart for explaining processing content by a server operation achievement statistic table generation unit.

Next, the processing content by the server operation achievement statistic table generation unit will be explained in accordance with a flowchart of FIG. 22.

The server operation achievement statistic table generation unit 34 starts the processing by activation of the software configuration decision unit 22.

Firstly, the server operation achievement statistic table generation unit 34 uses the content registered in the server operation achievement table 40 as source data and generates the server operation achievement statistic table 42, that is, a table in which the source data are aggregated as statistic data for each SW configuration ID (S81).

Subsequently, the server operation achievement statistic table generation unit 34 adds data registered in the software security problem management table 50, for example, the "number of security problem reports" registered in the number-of-security-problem-reports field 50C, to the security report field 42H of the server operation achievement statistic table 42 (S82) and terminates the processing in this routine. In this case, the information updated by the SW security report quantity update unit 36 is used as the information registered in the software security problem management table 50.

Figure 23:
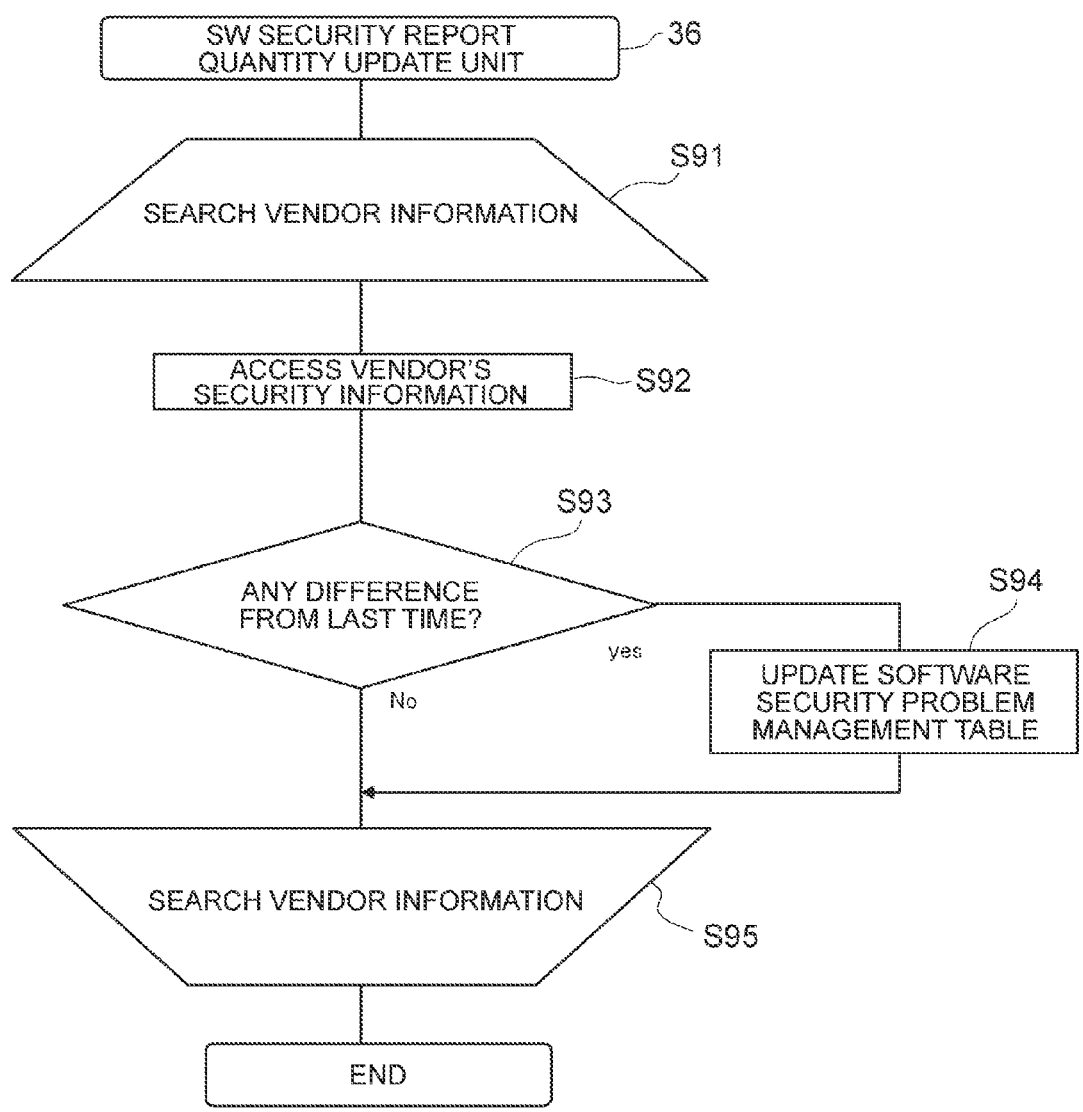
FIG. 23 is a flowchart for explaining processing content by an security report quantity update unit.

Next, the processing content by the SW security report quantity update unit will be explained in accordance with a flowchart of FIG. 23.

The SW security report quantity update unit 36 starts the processing by activation of the software configuration decision unit 22.

Firstly, the SW security report quantity update unit 36 searches vendor information at the communication site via the network 18 (S91), accesses security information among the publicized vendor information at the communication site (S92), and judges whether or not there is any difference between the accessed security information and the security information accessed last time (S93).

If the SW security report quantity update unit 36 obtains an affirmative judgment result in step S93, this means that there is a difference between the accessed security information and the security information accessed last time and, therefore, the SW security report quantity update unit 36 updates the information of the software security problem management table 50 based on this difference (S94) and proceeds to processing of step S95.

On the other hand, if the SW security report quantity update unit 36 obtains a negative judgment result in step S93, the SW security report quantity update unit 36 executes processing for searching all registered vendor devices for the vendor information (S95).

The SW security report quantity update unit 36 repeats the processing from step S91 to S95 until the processing for searching the vendor information on all the registered vendor devices is completed; and when the processing for searching the vendor information on all the registered vendor devices is completed, the SW security report quantity update unit 36 terminates the processing in this routine.

Figure 24:
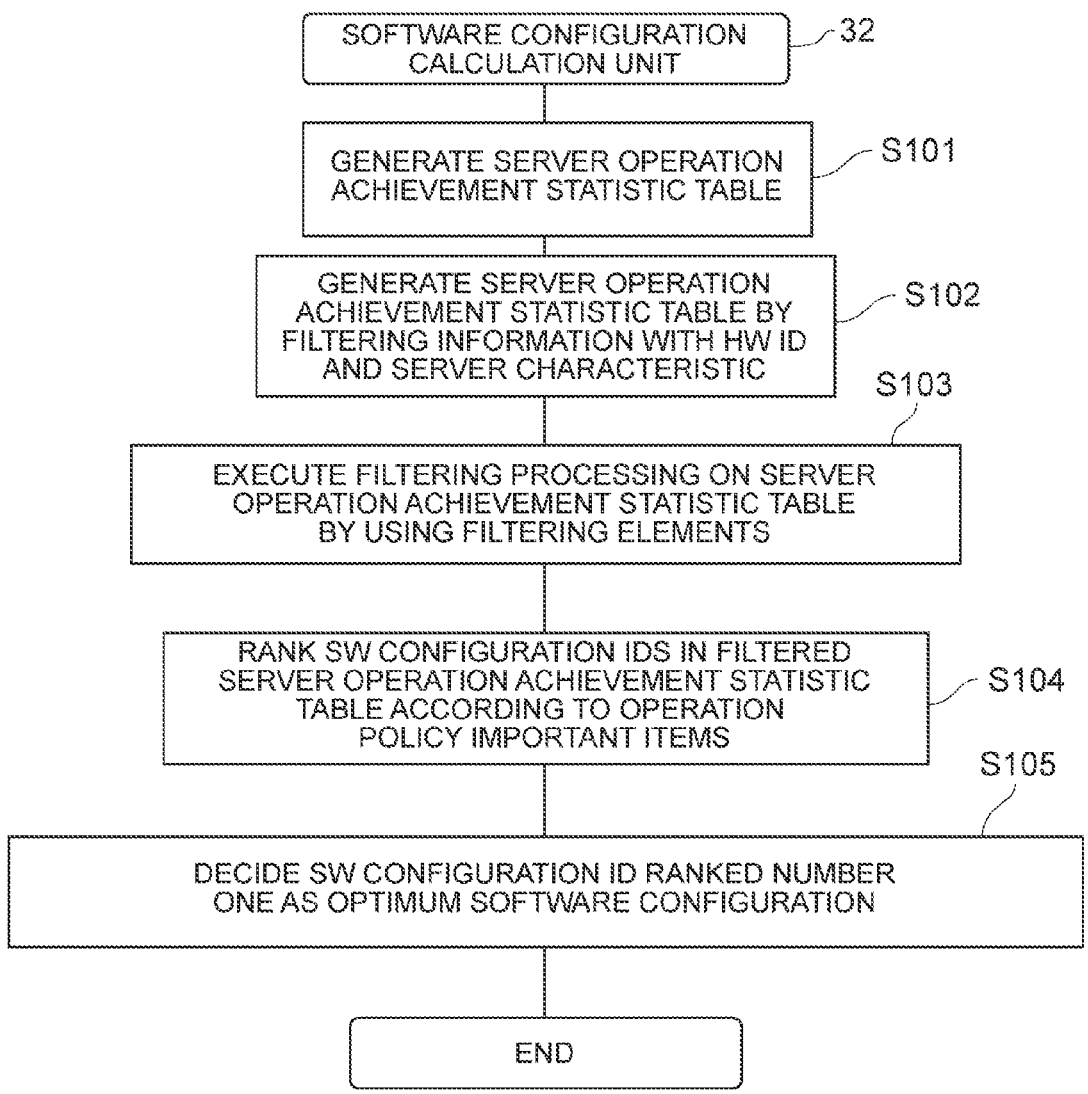
FIG. 24 is a flowchart for explaining processing content by a software configuration calculation unit.

Next, the processing content by the software configuration calculation unit will be explained in accordance with a flowchart of FIG. 24.

The software configuration calculation unit 32 starts the processing by activation of the software configuration decision unit 22.

Firstly, the software configuration calculation unit 32 activates the server operation achievement statistic table generation unit 34 and executes processing for generating the server operation achievement statistic table 42 (S101). Consequently, the server operation achievement statistic table generation unit 34 uses the content registered in the server operation achievement table 40 as source data and generates the server operation achievement statistic table 42 in which the source data are aggregated as statistic data for each SW configuration ID.

The software configuration calculation unit 32 generates the server operation achievement statistic table 420 as a filtered table obtained by executing processing for filtering each piece of information registered in the generated server operation achievement statistic table 42 (information about the plurality of pieces of software registered for each SW configuration ID) with the HWID and the server characteristic (S102).

Specifically speaking, the software configuration calculation unit 32 generates the server operation achievement statistic table 420 based on each piece of information registered in the server operation achievement statistic table 42 by using the following filtering elements (S103).

For example, the following elements are used as the filtering elements:
(1) information registered in the HW configuration ID 66B of the server configuration table 66;
(2) information registered in the software configuration (required software) 54A and the server characteristic 54B among the information registered in the server operation policy table 44; and
(3) information registered in the server operation policy table 44 and also registered in the item field 56C and the exclusion condition field 56D of the important item 56A in the important item table 56.

If the elements defined in (1) to (3) are used as the filtering elements, the software configuration information, which matches the HW configuration ID and the server characteristic and satisfies requirements of the software configuration (required software), is extracted from each piece of software configuration information registered in the server operation achievement statistic table 42; and the software configuration information which exceeds the exclusion condition for the important item is excluded from the extracted software configuration information. Then, the filtered server operation achievement statistic table 420 is generated from the remaining software configuration information, that is, the software configuration information which matches the HW configuration ID and the server characteristic and satisfies the requirements for the software configuration (required software) and which does not exceed the exclusion condition for the important item.

Next, the software configuration calculation unit 32 performs ranking of each piece of information (the software configuration information) registered in the generated filtered server operation achievement statistic table 420 in accordance with the content of the item field 56C corresponding to the priorities "1" to "3" registered in the priority field 568 among the important item 56A of the important item table 56 identified in the server operation policy table 44 (S104).

For example, the software configuration calculation unit 32 refers to each piece of information (the filtered server operation achievement statistic information) registered in the generated filtered server operation achievement statistic table 420 based on the items defined in the important item 56A (the "average operation time," the "number of times of unscheduled outage," and the "security report") and performs the ranking of each piece of the software configuration information of the generated filtered server operation achievement statistic information to decide the order of information which matches a highly-valued item as the operation achievement among the items defined in the important item 56A.

In this case, the software configuration calculation unit 32 decides: an SW configuration ID with the largest value of the "average operation time" as the ranking No. 1 for the processing of the priority "1"; an SW configuration ID with the smallest value of the "number of times of unscheduled outage" as the ranking No. 1 for the processing of the priority "2"; and an SW configuration ID with the smallest number of the "security report" as the ranking No. 1 for the processing of the priority "3."

Next, the software configuration calculation unit 32 identifies the SW configuration ID ranked No. 1 based on the processing results of the priority "1" to the priority "3" from among a plurality of SW configuration IDs registered in the filtered server operation achievement statistic table 420, decides the software configuration corresponding to the identified SW configuration ID as the optimum software configuration (S105), and terminates the processing in this routine.

Accordingly, when the management server 10 receives a software configuration decision request from the requestor server system, which issues the software configuration decision request, among the plurality of server systems 12 to 16, it can decide the software configuration information, which matches the hardware configuration of the requestor server system, as the optimum software configuration information based on the filtered server operation achievement statistic information registered in the filtered server operation achievement statistic table 420.

When the ranking No. 1 is to be decided based on the processing results of the priority "1" to the priority "3," the software configuration which is ranked as No. 1 in all the processing of the priority "1" to the priority "3" can be ranked as No. 1.

Moreover, if the software configuration is ranked as No. 1 for the processing of the priority "1," but is ranked as No. 2 or No. 3 for the processing of the priority "2" and the priority "3," the final ranking can be decided by considering how the software configuration which is ranked as No. 2 for the processing of the priority "1" is ranked for the processing of the priority "2" and the priority "3."

Furthermore, the content of the decided software configuration information and the content of the software configuration information mounted in the requestor server system are transferred to the requestor server system and the content of the decided software configuration information and the content of the software configuration information mounted in the requestor server system are displayed on a display screen of the requestor server system as shown in FIG. 15.

Furthermore, when the software configuration which is finally ranked as No. 1 is decided as the optimum software configuration and the decided optimum software configuration is displayed on screens of the server systems 12 to 16, and if the user does not adopt the displayed optimum software configuration, the software configuration which is finally ranked as No. 2 or subsequent rank positions can be sequentially decided as the optimum software configuration and the decided optimum software configuration can be sequentially displayed on the screens of the server systems 12 to 16.

Figure 25:
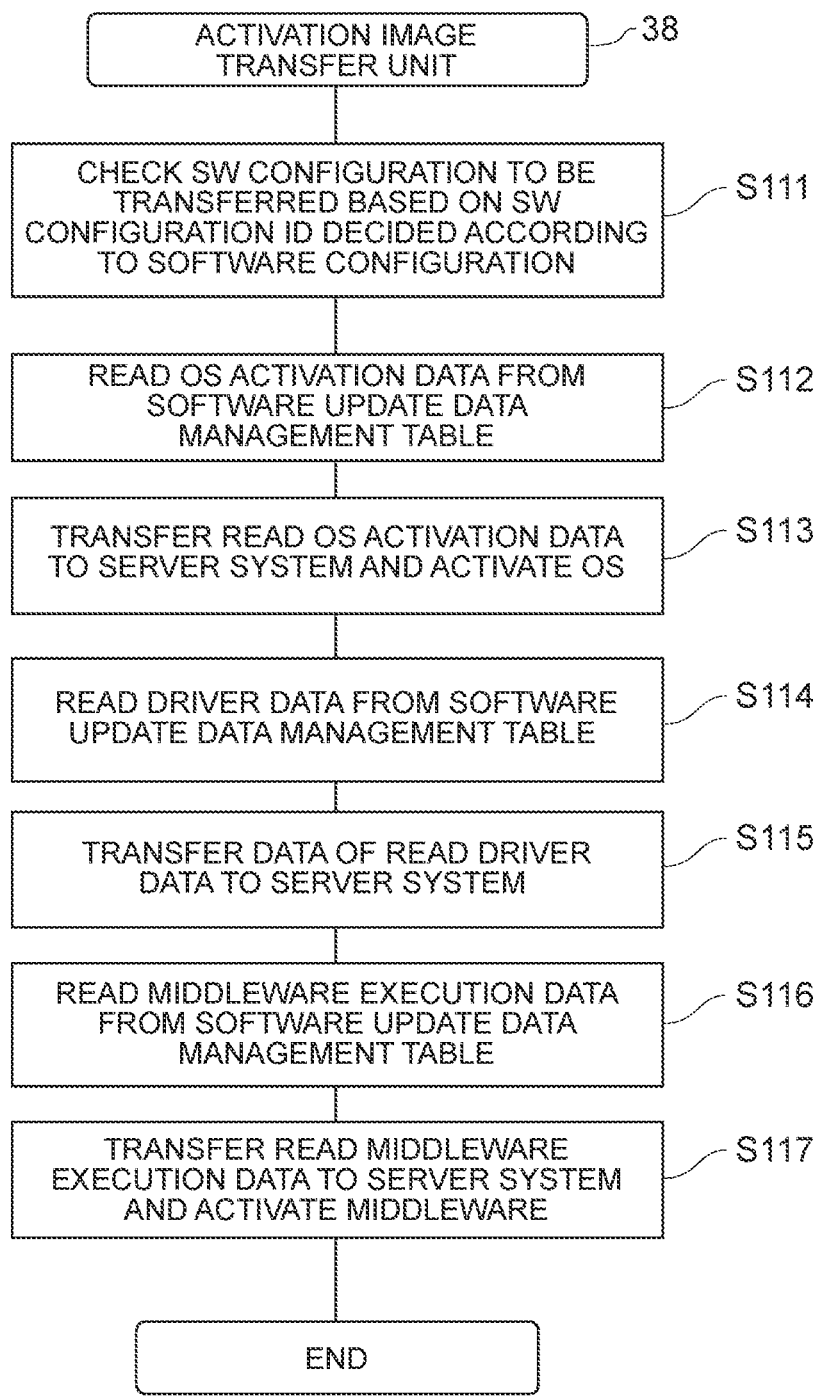
FIG. 25 is a flowchart for explaining processing content by an activation image transfer unit.

Next, the processing content by the activation image transfer unit will be explained in accordance with a flowchart of FIG. 25.

The activation image transfer unit 38 starts the processing by activation of the software configuration decision unit 22.

The activation image transfer unit 38 firstly checks the software configuration to be transferred based on the SW configuration ID decided by the software configuration calculation unit 32 (S111), reads OS activation data for activating the OS from the software update data management table 52 (S112), transfers the read OS activation data to the requestor server system, and activates the OS for the requestor server system (S113).

Next, the activation image transfer unit 38 reads driver data from the software update data management table 52 (S114) and transfers the read driver data to the requestor server system (S115).

Next, the activation image transfer unit 38 reads middleware execution data from the software update data management table 52 (S116), transfers the read middleware execution data to the requestor server system, activates the middleware of the requestor server system (S117), and terminates the processing in this routine.

Figure 26:
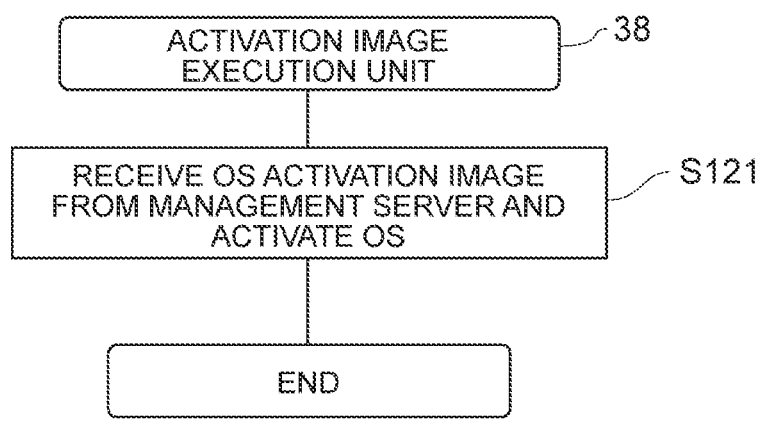
FIG. 26 is a flowchart for explaining processing content by an activation image execution unit.

Next, the processing content by the activation image execution unit will be explained in accordance with a flowchart of FIG. 26.

The activation image execution unit 38 starts the processing by activation of the processor 80 for each server system 12 to 16.

Firstly, when the activation image execution unit 38 receives an OS activation image from the management server 10, it activates the OS based on the received OS activation image (S121) and terminates the processing in this routine.

Figure 27:
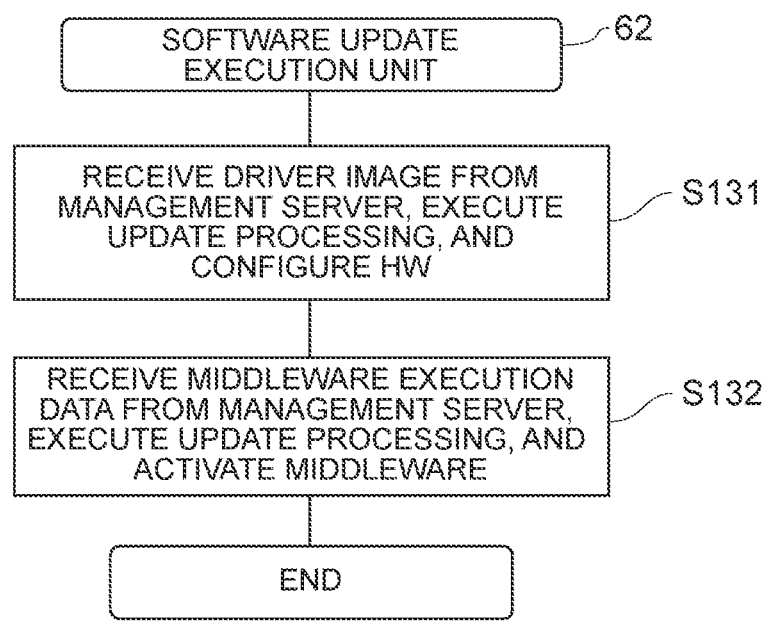
FIG. 27 is a flowchart for explaining processing content by a software update execution unit.

Next, the processing content by the software update execution unit will be explained in accordance with a flowchart of FIG. 27.

The software update execution unit 62 starts the processing by activation of the processor 80 for each server system 12 to 16.

When the software update execution unit 62 receives a driver image from the management server 10, it executes processing for updating the received driver image and comprises the hardware of each server system 12 to 16 (S131).

Subsequently, when the software update execution unit 62 receives middleware execution data from the management server 10, it executes processing for updating the received middleware execution data, activates the middleware (S132), and terminates the processing in this routine.

Figure 28:
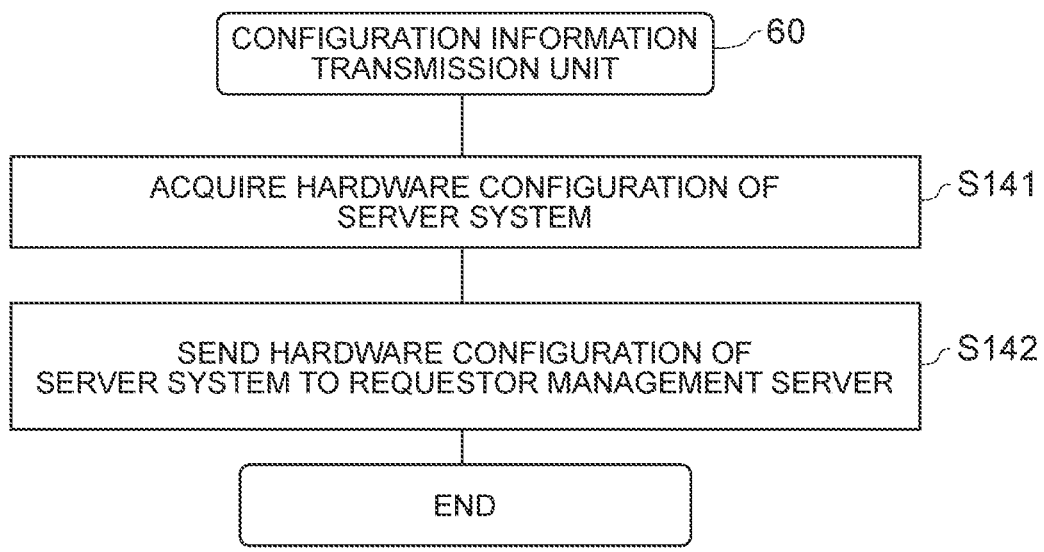
FIG. 28 is a flowchart for explaining processing content by a configuration information transmission unit.

Next, the processing content by the configuration information transmission unit will be explained in accordance with a flowchart of FIG. 28.

The configuration information transmission unit 60 starts processing by activation of the processor 80 for each server system 12 to 16.

The configuration information transmission unit 60 refers to the server configuration table 96 of each server system 12 to 16 and acquires the hardware configuration of each server system 12 to 16 (S141).

Subsequently, the configuration information transmission unit 60 sends the acquired hardware configuration to the requester management server 10 (S142) and terminates the processing in this routine.

When the management server 10 receives a software configuration decision request from a requester server system, which issues the software configuration decision request, among the plurality of server systems 12 to 16 according to this embodiment, it can decide software configuration information, which matches the hardware configuration of the requester server system, to be optimum software configuration information based on the filtered server operation achievement statistic information registered in the filtered server operation achievement statistic table 420.

When this happens, the management server 10: acquires software configuration information (information registered in the software configuration table 54) indicating the software configuration of software mounted in each server system 12 to 16, hardware configuration information (information registered in the server configuration table 66) indicating the hardware configuration of each server system 12 to 16, and operation achievement information (the operation time, the number of times of unscheduled outage, and the activation date and time) indicating operation achievements of each server system 12 to 16 from each server system 12 to 16; generates and retains server operation achievement information (information registered in the server operation achievement table 40) for managing the operation achievements of each server system 12 to 16 based on each acquired information; and generates server operation achievement statistic information (information registered in the server operation achievement statistic table 42) based on the retained server operation achievement information upon receipt of a software configuration decision request.

Moreover, the management server 10 aggregates the software configuration information about each server system 12 to 16 based on the server operation achievement information (information registered in the server operation achievement table 40) to which the security information is added; and generates the server operation achievement statistic information (information registered in the server operation achievement statistic table 42) for managing the operation achievement information about each server system 12 to 16 with respect to each piece of the aggregated software configuration information.

Furthermore, the management server 10: executes processing for filtering the generated server operation achievement statistic information by using the operation policy information; identifies software configuration information, which satisfies requirements defined by the operation policy information, from among the server operation achievement statistic information by using the SW configuration ID; generates filtered server operation achievement statistic information (information registered in the filtered server operation achievement table 420) for each identified SW configuration ID in order to manage the operation achievement information about each server system 12 to 16; and selects the software configuration information which matches the hardware configuration of the requestor server system from the generated filtered server operation achievement statistic information.

This embodiment is designed so that the software which is a target to be updated is updated based on the operation achievements of the plurality of server systems 12 to 16. So, when updating the software, the software which matches the hardware configuration, that is, the optimum software can be decided based on the operation achievements of the plurality of server systems 12 to 16.

Moreover, when updating the software, it is possible to construct a system by using the software which matches the hardware configuration (optimum software) according to this embodiment.

Furthermore, this embodiment is designed so that the processing for filtering the server operation achievement statistic information by using the operation policy information is executed in order to select the software, which matches the hardware configuration, from the software which matches the hardware configuration and the server characteristic. So, it is possible to select the software which considers achievements of a use method specific to the user of the requester server system.

Incidentally, it is also possible to select the software which matches the hardware configuration (optimum software) from among the server operation achievement statistic information without executing the processing for filtering the server operation achievement statistic information by using the operation policy information.

Furthermore, the present invention is not limited to the aforementioned embodiments and includes various variations. For example, the aforementioned embodiments have been described in detail in order to explain the invention in an easily comprehensible manner and are not necessarily limited to those having all the configurations explained above. Furthermore, part of the configuration of a certain embodiment can be added to, deleted from, or replaced with the configuration of another embodiment.

Furthermore, part or all of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 management server; 12, 14, 16 server system; 18 network; 20 server operation achievement management unit; 22 software configuration decision unit; 24 regular server operation achievement update unit; 26 unscheduled outage judgment unit; 28 server configuration information acquisition unit; 30 server operation policy management unit; 32 software configuration calculation unit; 34 server operation achievement statistic table generation unit; 36 SW security report quantity update unit; 38 activation image transfer unit; 40 server operation achievement table; 42 server operation achievement statistic table; 44 server operation policy table; 46 SW configuration ID management table; 48 HW configuration ID management table; 50 software security problem management table; 52 0 software update data management table; 60 configuration information transmission unit; 62 software update execution unit; 64 activation image execution unit; and 66 server configuration table.

The invention claimed is:
1. A computer system comprising:
a plurality of server systems for processing data; and
a management server for managing each server system,
wherein the management server comprises:
a memory;

a network interface configured to send and receive information to and from each server system via a network; and a hardware processor configured to acquire software configuration information indicating a software configuration about software mounted in each server system, hardware configuration information indicating a hardware configuration of each server system, and operation achievement information indicating operation achievements of each server system from each server system;

generate and retain server operation achievement information in the memory for managing operation achievements of each server system based on each acquired information; and decide software configuration information, which matches a hardware configuration of a requestor server system, which issues a software configuration decision request, based on the retained server operation achievement information upon receipt of the software configuration decision request from the requestor server system among the plurality of server systems;

wherein the management server is further configured to acquire the operation achievement information from each server system on a real-time basis and update the retained server operation achievement information in accordance with the acquired operation achievement information;

wherein the management server is further configured to access security information publicized at a communication site connected to the network, acquire security information about software mounted in each server system from the publicized security information, and add the acquired security information to the retained server operation achievement information;

wherein the management server is further configured to acquire information defining a software configuration and a server characteristic, which are essential to update the software configuration of the requestor server system, and operation policy information including information, in which an important item when updating the software configuration of the requestor server system is defined, from the requestor server system and decide the software configuration information, which matches the hardware configuration of the requestor server system, based on the server operation achievement information, to which the security information is added, and the acquired operation policy information; and wherein the management server is further configured to aggregate the software configuration information about each server system based on the server operation achievement information, to which the security information is added; generate server operation achievement statistic information for managing the operation achievement information about each server system with respect to each piece of the aggregated software configuration information; execute processing for filtering the generated server operation achievement statistic information by using the operation policy information; identify software configuration information, which satisfies a requirement defined by the operation policy information, from among the generated server operation achievement statistic information based on a result of the filtering processing; generate filtered server operation achievement statistic information for managing the operation achievement information about each server system with respect to each piece of the identified software configuration information; and select the software configuration information, which matches the hardware configuration about the requester server system, from the generated filtered server operation achievement statistic information.

2. A computer system according to claim 1, wherein the management server: searches the generated filtered server operation achievement statistic information based on items defined as the important item among the acquired operation policy information; performs ranking of each piece of software configuration information of the generated filtered server operation achievement statistic information to decide an order of compatibility with a highly-valued item as an operation achievement from among the items defined as the important item; and decides software configuration information which is ranked number one in the ranking to be the software configuration information which matches the hardware configuration of the requestor server system.

3. A computer system according to claim 2, wherein the management server transfers the content of the decided software configuration information and the content of the software configuration information mounted in the requester server system to the requestor server system and displays the content of the decided software configuration information and the content of the software configuration information mounted in the requestor server system on a display screen of the requestor server system.

4. A computer system according to claim 3, wherein on condition that the decided software configuration information is adopted by the requester server system, the management server transfers activation data for activating the decided software configuration information to the requestor server system.

5. A information processing method for a computer system including a plurality of server systems for processing data and a management server for managing each server system by sending and receiving information to and from each server system via a network, the information processing method comprising:

a step executed by the management server acquiring software configuration information indicating a software configuration about software mounted in each server system, hardware configuration information indicating a hardware configuration of each server system, and operation achievement information indicating operation achievements of each server system from each server system;

a step executed by the management server generating and retaining server operation achievement information for managing operation achievements of each server system based on each acquired information;

a step executed by the management server deciding software configuration information, which matches a hardware configuration of a requester server system, which issues a software configuration decision request, based on the retained server operation achievement information upon receipt of the software configuration decision request from the requestor server system among the plurality of server systems;

a step executed by the management server acquiring the operation achievement information from each server system on a real-time basis;

a step executed by the management server updating the retained server operation achievement information in accordance with the acquired operation achievement information;

a step executed by the management server accessing security information publicized at a communication site connected to the network;

a step executed by the management server acquiring security information about software mounted in each server system from the publicized security information;

a step executed by the management server adding the acquired security information to the retained server operation achievement information;

a step executed by the management server acquiring information defining a software configuration and a server characteristic, which are essential to update the software configuration of the requestor server system, and operation policy information including information, in which an important item when updating the software configuration of the requestor server system is defined, from the requestor server system; and a step executed by the management server deciding the software configuration information, which matches the hardware configuration of the requester server system, based on the server operation achievement information, to which the security information is added, and the acquired operation policy information.

6. An information processing method for a computer system according to claim 5, further comprising:

a step executed by the management server aggregating the software configuration information about each server system based on the server operation achievement information, to which the security information is added;

a step executed by the management server generating server operation achievement statistic information for managing the operation achievement information about each server system with respect to each piece of the aggregated software configuration information:

a step executed by the management server executing processing for filtering the generated server operation achievement statistic information by using the operation policy information;

a step executed by the management server identifying software configuration information, which satisfies a requirement defined by the operation policy information, from among the generated server operation achievement statistic information based on a result of the filtering processing;

a step executed by the management server generating filtered server operation achievement statistic information for managing the operation achievement information about each server system with respect to each piece of the identified software configuration information; and a step executed by the management server selecting the software configuration information, which matches the hardware configuration about the requestor server system, from the generated filtered server operation achievement statistic information.

7. An information processing method for a computer system according to claim 6, further comprising:

a step executed by the management server searching the generated filtered server operation achievement statistic information based on items defined as the important item among the acquired operation policy information;

a step executed by the management server performing ranking of each piece of software configuration information of the generated filtered server operation achievement statistic information to decide an order of compatibility with a highly valued item as an operation achievement from among the items defined as the important item; and deciding software configuration information which is ranked number one in the ranking to be the software configuration information which matches the hardware configuration of the requestor server system.

8. An information processing method for a computer system according to claim 7, further comprising:

a step executed by the management server transferring the content of the decided software configuration information and the content of the software configuration information mounted in the requestor server system to the requestor server system; and a step executed by the management server displaying the content of the decided software configuration information and the content of the software configuration information mounted in the requestor server system on a display screen of the requester server system.

9. An information processing method for a computer system according to claim 8, further comprising a step executed, on condition that the decided software configuration information is adopted by the requester server system, by the management server transferring activation data for activating the decided software configuration information to the requestor server system.

10. A computer system including a plurality of server systems for processing data by sending and receiving information to and from the plurality of server systems via a network, the computer system comprising:

a memory coupled to a hardware processor, the hardware processor configured to perform:

a step of acquiring software configuration information indicating a software configuration about software mounted in each server system, hardware configuration information indicating a hardware configuration of each server system, and operation achievement information indicating operation achievements of each server system from each server system;

a step of generating and retaining server operation achievement information for managing operation achievements of each server system based on each acquired information;

a step of deciding software configuration information, which matches a hardware configuration of a requestor server system, which issues a software configuration decision request, based on the retained server operation achievement information upon receipt of the software configuration decision request from the requestor server system among the plurality of server systems;

a step of acquiring the operation achievement information from each server system on a real-time basis;

a step of updating the retained server operation achievement information in accordance with the acquired operation achievement information;

a step of accessing security information publicized at a communication site connected to the network;

a step of acquiring security information about software mounted in each server system from the publicized security information;

a step of adding the acquired security information to the retained server operation achievement information;

a step of acquiring information defining a software configuration and a server characteristic, which are essential to update the software configuration of the requestor server system, and operation policy information including information, in which an important item when updating the software configuration of the requestor server system is defined, from the requestor server system; and a step of deciding the software configuration information, which matches the hardware configuration of the requester server system, based on the server operation achievement information, to which the security information is added, and the acquired operation policy information.

* * * * *